United States Patent
Chen

(10) Patent No.: US 10,848,303 B2
(45) Date of Patent: Nov. 24, 2020

(54) METHODS AND APPARATUSES FOR AUTHENTICATION IN QUANTUM KEY DISTRIBUTION AND/OR QUANTUM DATA COMMUNICATION

(71) Applicant: Yuhua Chen, Houston, TX (US)

(72) Inventor: Yuhua Chen, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 281 days.

(21) Appl. No.: 15/556,152

(22) PCT Filed: Mar. 9, 2016

(86) PCT No.: PCT/US2016/021501
§ 371 (c)(1),
(2) Date: Sep. 6, 2017

(87) PCT Pub. No.: WO2016/145037
PCT Pub. Date: Sep. 15, 2016

(65) Prior Publication Data
US 2018/0048466 A1    Feb. 15, 2018

Related U.S. Application Data

(60) Provisional application No. 62/130,094, filed on Mar. 9, 2015.

(51) Int. Cl.
*H04L 9/08* (2006.01)
*H04L 9/32* (2006.01)
*H04B 10/70* (2013.01)

(52) U.S. Cl.
CPC .......... *H04L 9/0852* (2013.01); *H04B 10/70* (2013.01); *H04L 9/32* (2013.01)

(58) Field of Classification Search
CPC .......... H04L 9/0852; H04L 9/32; H04B 10/70
(Continued)

(56) References Cited

U.S. PATENT DOCUMENTS 9,246,680 B2    1/2016   Verma et al.
10,585,644 B2 *  3/2020   Chong .................. G01J 1/1626
(Continued)

OTHER PUBLICATIONS

Mayssaa El Rifai; Pramode K. Verma, "An Algorithmic Approach to Securing the Three-stage Quantum Cryptography Protocol", Presented at the IEEE TrustCom-13, the 12th IEEE International Conference on Trust, Security and Privacy in Computing and Communications, Melbourne, Australia, Jul. 16-18, 2013.
(Continued)

*Primary Examiner* — Abu S Sholeman
(74) *Attorney, Agent, or Firm* — Winstead PC

(57) ABSTRACT

Systems and methods of authenticating and/or communicating key and/or data between communication parties using quantum channels are provided. In some embodiments, authentication may be provided during transmission (including at various stages), without transmission, before transmission, and/or without keys. Such systems and methods allow authentication to be performed on a bit-by-bit basis using the same quantum communication channel. Further, these systems and methods prevent an eavesdropper from gaining useful information, and/or allow man-in-the-middle attacks to be detected.

19 Claims, 21 Drawing Sheets

(58) Field of Classification Search
USPC .................................................. 380/256, 263
See application file for complete search history.

(56) References Cited

U.S. PATENT DOCUMENTS

| | | | | |
|---|---|---|---|---|
| 2005/0036624 A1* | 2/2005 | Kent | ..................... | H04L 9/0858 380/277 |
| 2006/0120529 A1* | 6/2006 | Gisin | ..................... | H04L 9/0852 380/256 |
| 2007/0076884 A1* | 4/2007 | Wellbrock | ............ | H04L 9/0858 380/263 |
| 2008/0147759 A1* | 6/2008 | Fiorentino | ............. | B82Y 10/00 708/250 |
| 2009/0106553 A1* | 4/2009 | Wang | ..................... | A63B 7/00 713/168 |
| 2010/0027794 A1* | 2/2010 | Yuan | ..................... | H04B 10/70 380/255 |
| 2013/0315395 A1* | 11/2013 | Jacobs | .................. | H04L 9/0852 380/278 |
| 2014/0068765 A1* | 3/2014 | Choi | ..................... | H04L 9/0852 726/23 |
| 2015/0016610 A1* | 1/2015 | Verma | .................. | H04L 9/0852 380/256 |

OTHER PUBLICATIONS

Mandal, Sayonnha, Macdonald, Gregory, Rifai, Mayssaa El, Punekar, Nikhil, Zamani, Farnaz, Chen, Yuhua, Kak, Subhash, Verma, Pramode K., Huck, Robert C. and Jr., James J. Sluss. "Implementation of Secure Quantum Protocol using Multiple Photons for Communication." CoRR abs/1208.6198 (2012).

* cited by examiner

METHODS AND APPARATUSES FOR AUTHENTICATION IN QUANTUM KEY DISTRIBUTION AND/OR QUANTUM DATA COMMUNICATION

RELATED APPLICATIONS

This application claims the benefit of U.S. Provisional Patent Application No. 62/130,094 filed on Mar. 9, 2015, which is incorporated herein by reference.

STATEMENT REGARDING FEDERALLY SPONSORED RESEARCH

This invention was made with government support under Grant No. 1117148 awarded by the National Science Foundation. The government has certain rights in the invention.

FIELD OF THE INVENTION

This invention relates to quantum cryptography, and more particularly, to providing secure quantum key distribution and/or quantum data communication.

BACKGROUND OF INVENTION

Classical cryptography methods rely on computational complexity to provide information and communication security. With ever increasing computing power and the potential development of quantum computers, classical cryptography may become more and more vulnerable. Quantum cryptography is based on Heisenberg Uncertainty Principle and No-Cloning Theorem, and is the only known means of providing unconditional security.

However, exiting quantum cryptography methods are susceptible to the man-in-the-middle attack. In addition, BB84 based quantum protocols are susceptible to photon siphoning attacks. More specifically, BB84 requires a single photon per time slot to be used for the communication. In order to avoid the man-in-the-middle attack, quantum protocols use classical authentication methods to authenticate the communication parties prior to the communication. Unfortunately, this method has the following issues: First, authentication is based on classical cryptography methods, which rely on computational complexity. This basically defeats the purpose of quantum cryptography, which is to try to get away from the computational complexity assumption. Second, even if the two communication parties are authenticated, Eve can attack the channels after the authentication process.

Systems and methods discussed further herein provide authentication methods using quantum channels that allow secure communication on these channels and/or quantum key distribution. These methods provide for authenticating communication parties during communication. The methods may provide authentication that is multi-photon tolerant. Further, the methods allow the detection of man-in-the-middle attacks.

SUMMARY OF THE INVENTION

In some embodiments, methods are disclosed to provide secure quantum key distribution and quantum data communication. In some embodiments, communication parties are authenticated using quantum authentication protocols involving two or three stages utilizing quantum channels where a number of photons transmitted are kept below a predetermined threshold. In some embodiments, authentication of the communication parties is performed during quantum key distribution and/or quantum data communication. In some embodiments, multiple photons can be used to authenticate communication parties. In some embodiments, man-in-the-middle attacks can be detected.

In some embodiments, a sender may couple a first quantum state with a first random quantum state to generate a second quantum state, and the second quantum state is transmitted through a quantum channel to a receiver. The receiver may couple the second quantum state with an authentication key to generate a third quantum state, and the third quantum state may be transmitted back to the sender. The sender may authenticate the receiver by coupling the third quantum state with a negative of the random quantum state and a negative of the authentication key and comparing the resulting state to the first quantum state. If the resulting state and first quantum state are equal, the receiver is authenticated. If the two states are not equal, authentication has failed.

In another embodiment, the receiver may receive the second quantum state as discussed above. However, the second quantum state may be coupled with a quantum state $\theta_x$, where the quantum state $\theta_x$ is prepared based on information X, and optionally coupled with the authentication key, to generate a third quantum state. Once the third quantum state is transmitted to the sender, it may be coupled with a negative of the first random quantum state, and optionally coupled with a negative of the authentication key if necessary. Because the senders know the resulting state, which is equivalent to the quantum state $\theta_x$, the sender can determine the information X.

In yet another embodiment, a quantum state $\theta_x$ may be prepared by a first party based on information X. Further, the first party may also generate a first random quantum state with a first random number generator; couple the quantum state $\theta_x$ with the first random quantum state and an authentication key $\varphi$ to generate a first quantum state $\Psi_1$; and transmit the first quantum state $\Psi_1$ to a second party. The second party may generate a second random quantum state that is coupled with the first quantum state $\Psi_1$ to provide a second quantum state $\Psi_2$ that is transmitted to the first party. The first party may couple the second quantum state $\Psi_2$ with a negative of the first random quantum state to provide a third quantum state $\Psi_3$, and transmit the third quantum state $\Psi_3$ to the second party. The second party may couple the third quantum state $\Psi_3$ with a negative of the second random quantum state and the authentication key $\varphi$, thereby allowing the second party to determine the quantum state $\theta_x$ and the information X.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
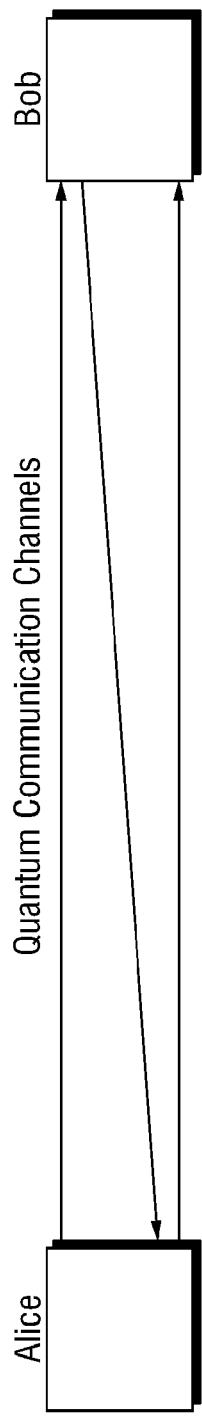
FIG. 1 is an illustrative implementation of quantum communication channels.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Methods and apparatuses for providing secure quantum key distribution and/or quantum data communication are discussed herein. These methods and apparatuses may provide authentication using quantum channels. Further, the methods and apparatus discussed herein may provide authentication during quantum key distribution and/or quantum data communication. In some embodiments discussed herein, a quantum protocol utilizes two or three stages for authentication and/or communication. In some embodiments discussed herein, a number of photons transmitted through a quantum channel may be below a predetermined threshold. As a nonlimiting example, the number of photons may be below a threshold that allows the quantum state to be deterministically measured, which may be referred to herein as a nondeterministic quantum channel.

These methods and apparatuses allow communication parties to be authenticated prior to and/or during the communication, or authentication and/or communication can be interleaved. The methods and apparatuses minimize the risk of man-in-the-middle attacks. Various nonlimiting embodiments that illustrate the basic operations of the methods and apparatuses are explained as follows.

While embodiments of quantum cryptography technologies discussed herein identify several methods, processes, and/or schemes that may be utilized, these embodiments are nonlimiting and are provided solely for illustrative purposes. Thus, it is noted that the quantum key distribution and quantum data communication methods and apparatuses discussed herein are in no way limited to the examples methods, processes, and/or schemes discussed herein. It will be recognized by one of ordinary skill in the art that any suitable methods, processes, and/or schemes known in the art may be utilized in conjunction with or to modify the quantum cryptography methods and apparatuses discussed herein.

The systems and methods discussed herein can also be applied to hybrid modes, where both classical cryptography and quantum cryptography methods are used, to provide communication and information security.

Classical cryptography is based on computational complexity. However, with ever increasing computational power, classical cryptography becomes more and more vulnerable. On the other hand, quantum cryptography is based on quantum mechanics, and is the only means that can provide demonstrable security.

As utilized for the purposes of clarity in the following exemplary illustrations discussed herein, Alice and Bob refer to two communicating parties (or a 1$^{st}$ Communicating Party and 2$^{nd}$ Communicating Party respectively) communicating via a communication channel(s). It shall be understood from the embodiments discussed herein that, in some embodiments, Alice and Bob may respectively be a party to be authenticated and a party performing authentication (or Authenticating Party). In other embodiments, Alice's and Bob's roles may be switched so they may respectively be a party performing authentication and a party to be authenticated. A communication channel can be realized using any suitable means, including, but not limiting to, free space, optical fiber, and/or wireless communication, with any suitable distance (long distance or near field). Communication parties can be sub-systems embedded in a large system, including but not limiting to computers, routers, data storage systems, servers, automated teller machine (ATM), user authentication devices (stationary or mobile), and any system where secure data access is needed. It is desirable for the communication parties to communicate via a secure channel(s) to prevent other parties from accessing data passed between the communication parties. Further, Eve refers to a party attempting to attack or eavesdrop on the communication channel between Alice and Bob in the following exemplary illustrations discussed herein.

Figure 2:
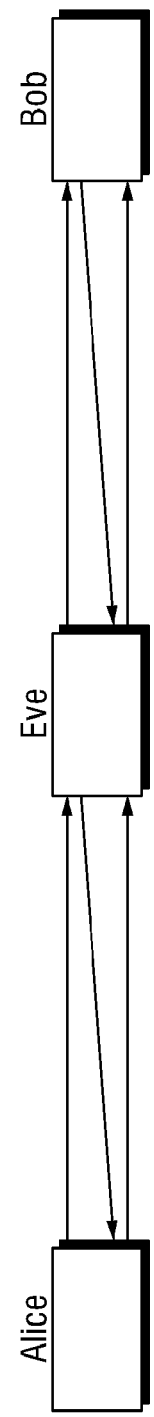
FIG. 2 is an illustrative implementation of man-in-the-middle attack.
Figure 3:
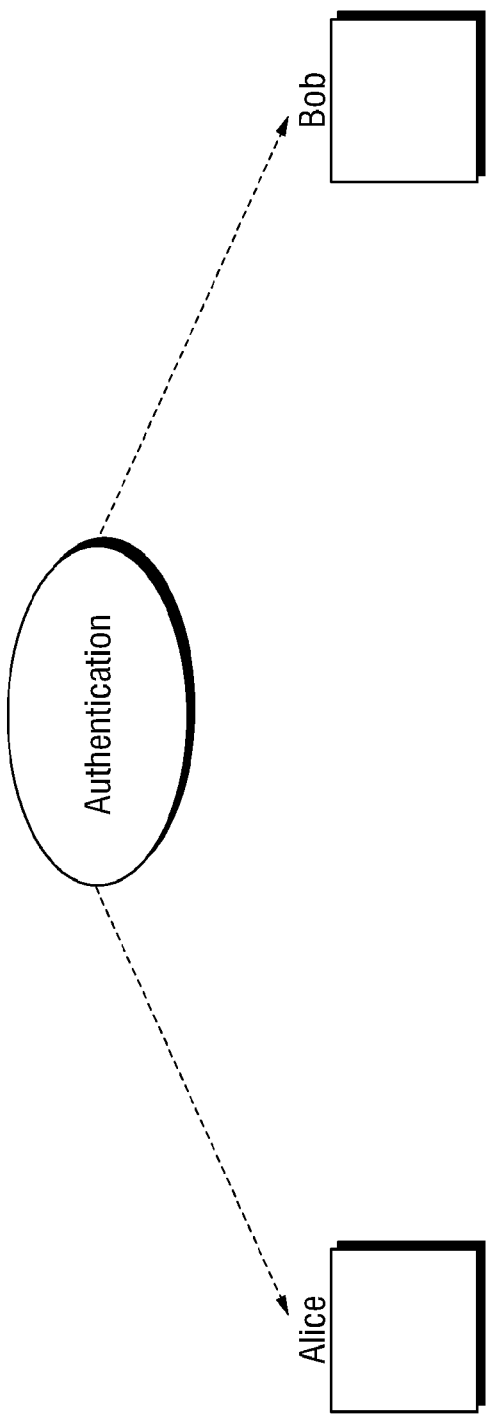
FIG. 3 is an illustrative implementation of authenticating communication parties.
Figure 4:
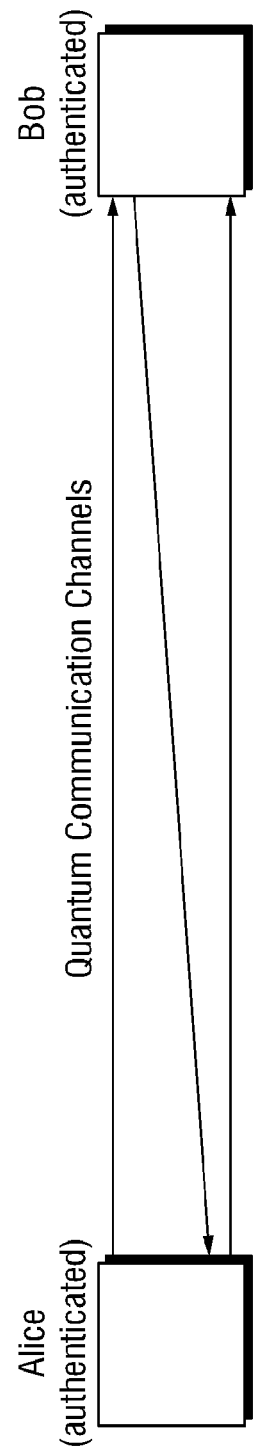
FIG. 4 is an illustrative implementation of quantum communication channels between two authenticated parties.
Figure 5:
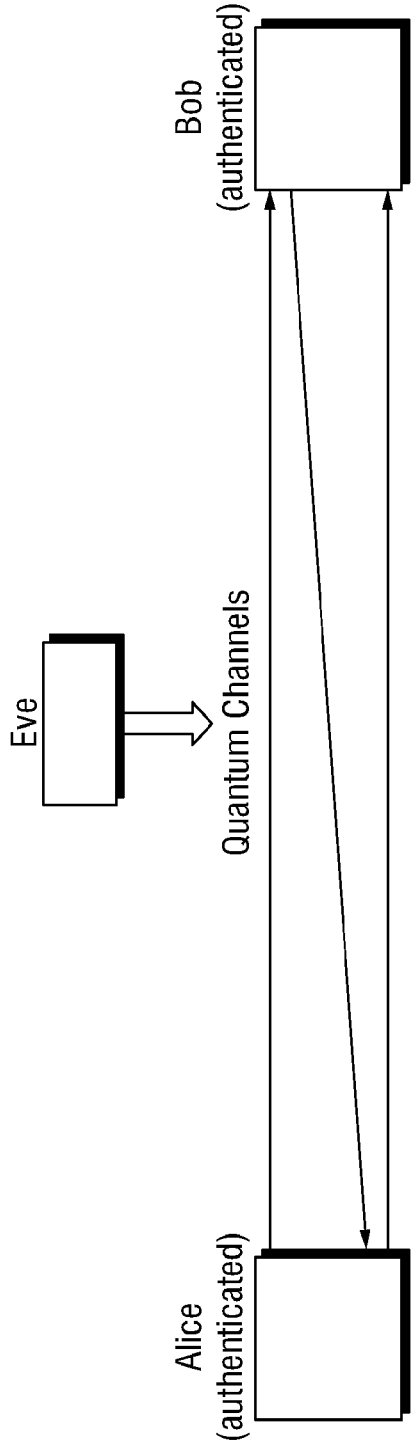
FIG. 5 is an illustrative implementation of man-in-the-middle attack after communication parties are authenticated.
Figure 6:
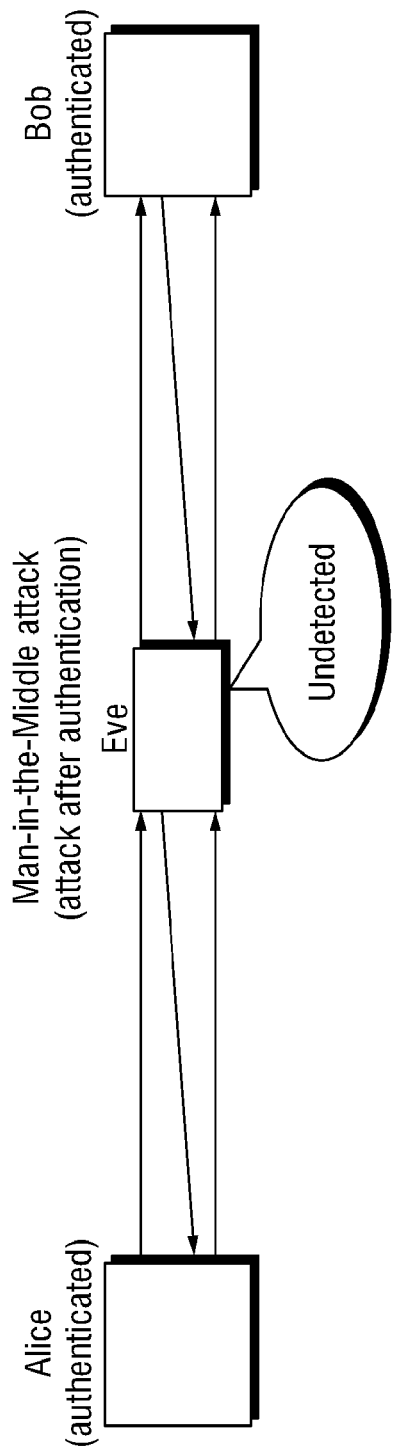
FIG. 6 is an illustrative implementation of undetected man-in-the-middle attack after two communication parties are authenticated.

FIG. 1 illustrates Alice and Bob communicate using one or more quantum communication channels. Unfortunately, almost all quantum cryptography protocols are susceptible to man-in-the-middle attacks, as illustrated in FIG. 2. In the man-in-the-middle attack, Eve pretends to be the legitimate recipient Bob, and communicates with Alice while communicating with Bob acting as if she is Alice. In order to avoid man-in-the-middle attacks, existing quantum cryptography protocols typically require a third-party authentication for Alice and Bob as illustrated in FIG. 3. Such methods have the following drawbacks:

In the case where Alice and Bob are truly authenticated as shown in FIG. 4, Eve can attack the quantum communication channels after Alice and Bob are authenticated to circumvent third-party authentication as illustrated in FIG. 5, leaving such an attack undetected, as shown in FIG. 6.

Figure 7:
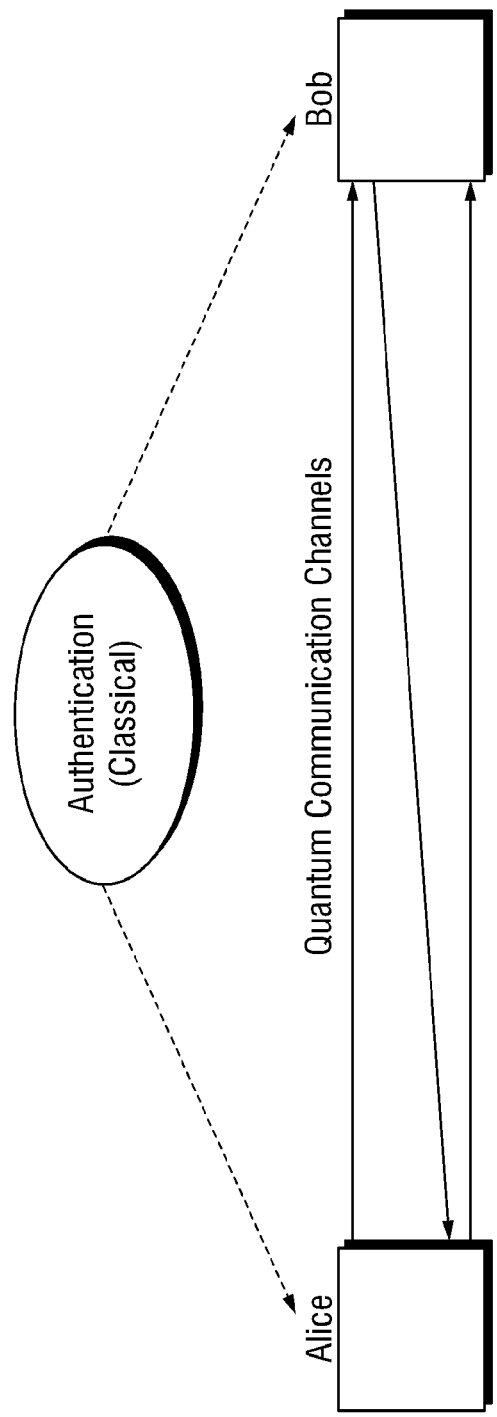
FIG. 7 is an illustrative implementation of classical authentication between two parties communicating over quantum communication channel.

In addition, authentication methods are typically based on classical cryptography's assumptions that utilize computational complexity as illustrated in FIG. 7. Requiring authenticating of Alice and Bob using classical methods defeats the purpose of using quantum cryptography.

Systems and methods discussed herein provide authentication methods using quantum channels; methods of authenticating communication parties during communication; and/or provide methods of detecting man-in-the-middle attacks.

Figure 8:
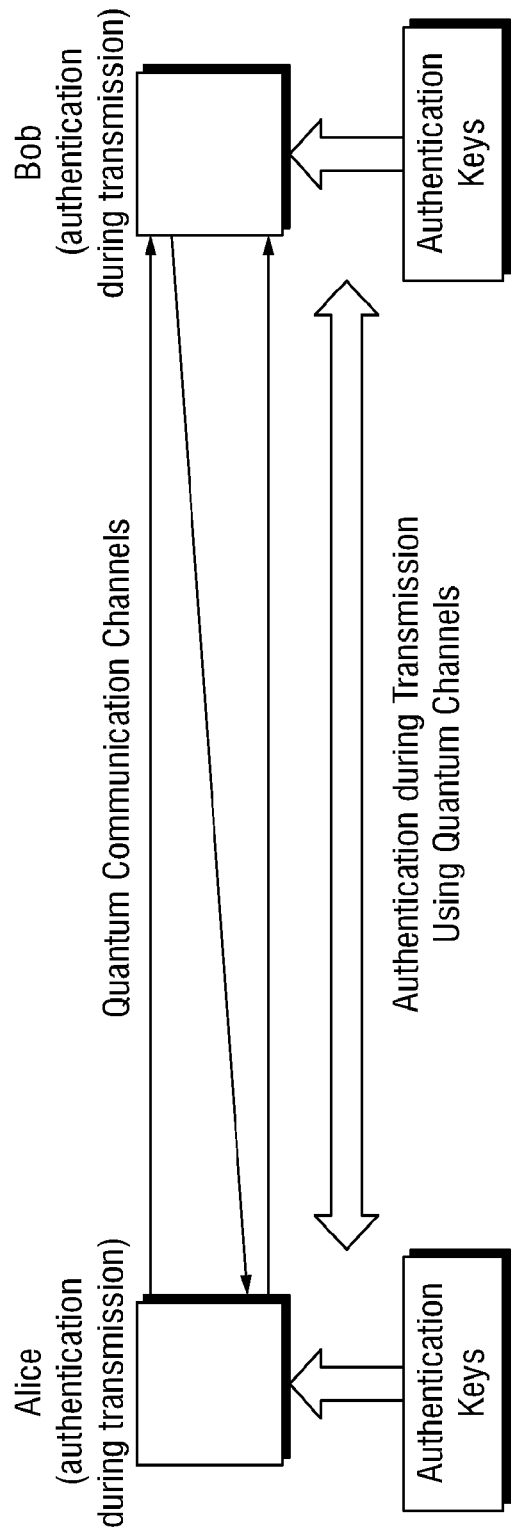
FIG. 8 is an illustrative implementation of authenticating communication parties using quantum channels during transmission.

FIG. 8 is an illustrative implementation of an improved quantum key distribution and/or quantum data communication system and method. In one embodiment, Alice and Bob are authenticated with pre-shared authentication key using quantum communication channels. In another embodiment, the authentication process is conducted during the quantum key distribution or quantum data communication.

The advantages of the systems and methods discussed herein are as follows:

The authentication process is conducted using quantum channels or quantum communication channels, as opposed to classical authentication methods. This eliminates the vulnerability which is inherent to any methods based on computational complexity. The quantum channels discussed herein utilize a number of photons below a threshold where a quantum state can be deterministically measured. Thus, the quantum channels discussed herein may be characterized as nondeterministic quantum channels.

The authentication process can be performed during quantum key distribution or quantum data communication process, eliminating the possibility that Eve attacks the quantum channel after Alice and Bob are authenticated.

Figure 9:
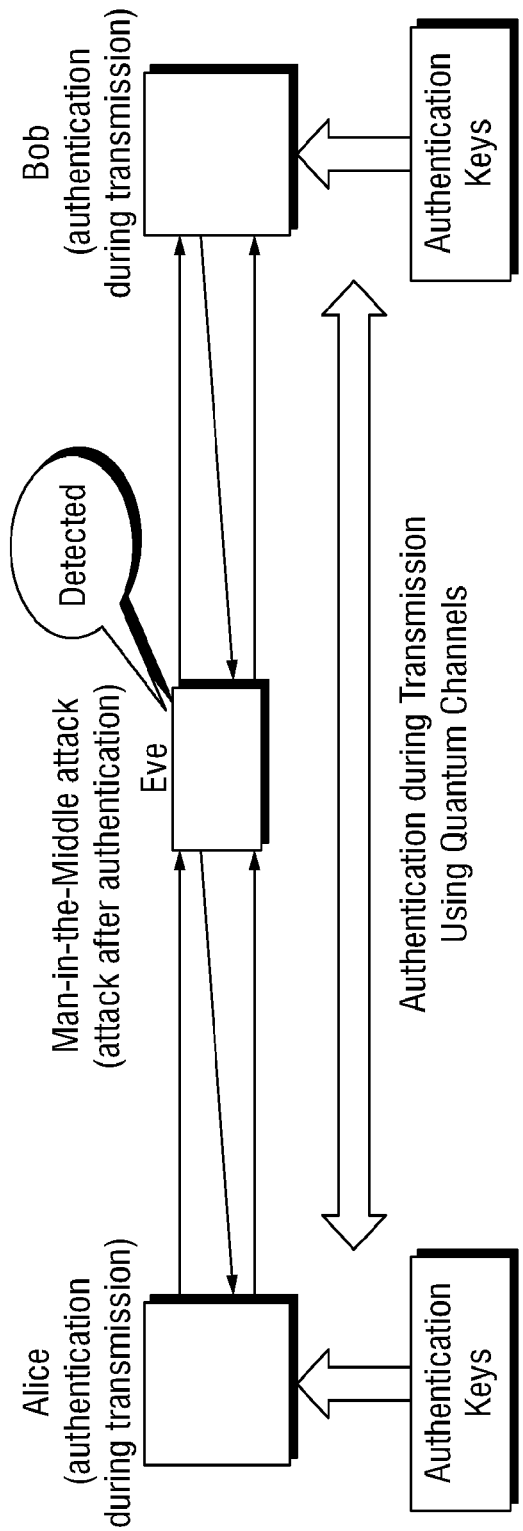
FIG. 9 is an illustrative implementation of detecting man-in-the-middle attack using authentication during transmission method.

As illustrated in FIG. 9, since Eve does not possess the authentication key, she cannot launch a man-in-the-middle attack and obtain useful information without being detected.

Figure 10A:
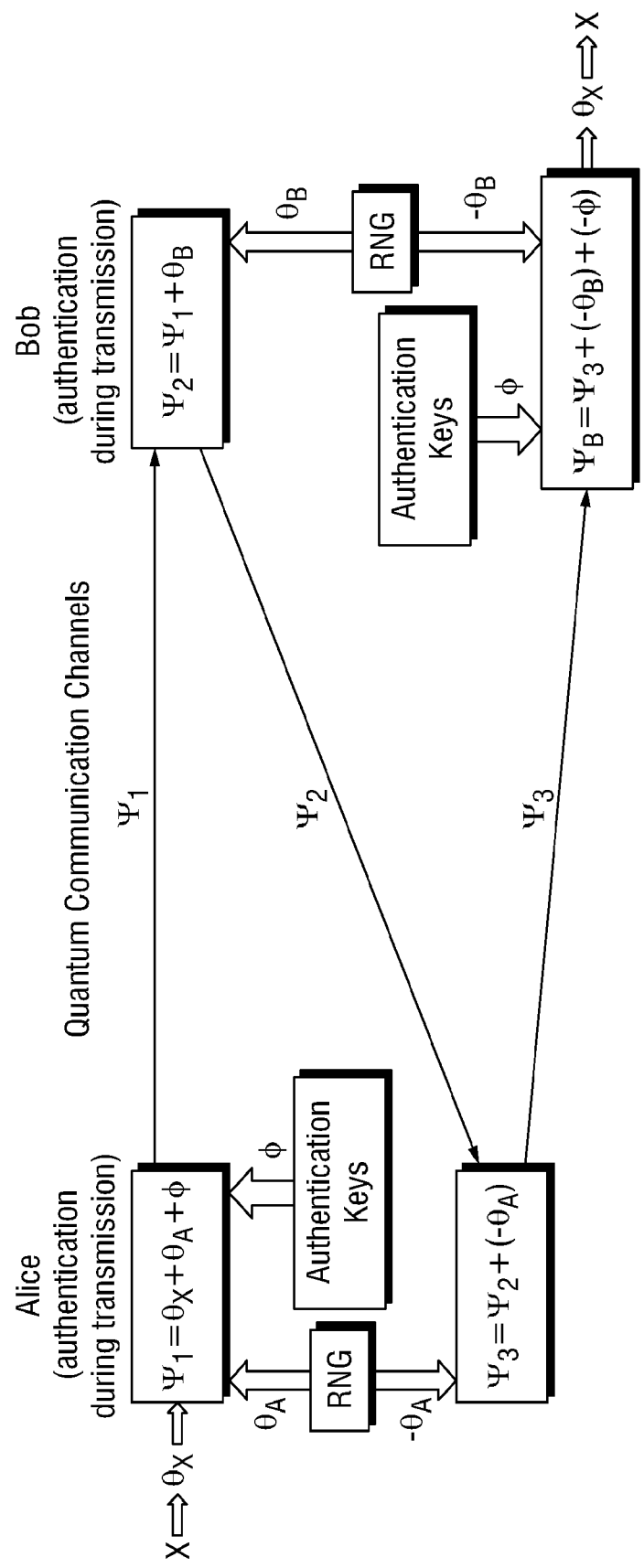
FIG. 10A is an illustrative implementation of authentication operation during transmission.

FIG. 10A is an exemplary embodiment the improved systems and methods of authenticating Alice and Bob. Alice prepares a quantum state $\theta_X$ based on the status of X. She then uses a random number generator (RNG) to generate a state of $\theta_A$. Alice couples $\theta_X$ with $\theta_A$ and the authentication key $\varphi$, and generates a corresponding quantum state $\Psi_1$. For example, $\theta_X$, $\theta_A$, and $\varphi$ may represent quantum states with different quantum state values that are coupled together to determine the quantum state $\Psi_1$. $\Psi_1$ is the quantum state transmitted by Alice on the quantum communication channel to Bob.

Bob, on receiving quantum state $\Psi_1$ from Alice, obtains state $\theta_B$ from his random number generator. He couples received quantum state $\Psi_1$ with $\theta_B$, and generates a corresponding quantum state $\Psi_2$. $\Psi_2$ is the quantum state transmitted from Bob to Alice.

Alice, on receiving quantum state $\Psi_2$ from Bob, couples $\Psi_2$ with $(-\theta_A)$, and generates a corresponding quantum state $\Psi_3$. Quantum state $\Psi_3$ is transmitted by Alice to Bob on the quantum channel.

Bob, on receiving quantum state $\Psi_3$, couples $\Psi_3$ with $(-\theta_B)$, and $(-\varphi)$, where $\varphi$ is the authentication key, and recovers quantum state $\theta_X$, and obtains the key or data X.

In one embodiment, quantum state $\theta_X$ is in one of the two orthogonal states pre-determined by Alice and Bob, based on the status of X (0, or 1).

It is worth noting that in the preferred embodiment discussed in FIG. 10A, information X is sent along with the authentication key $\varphi$ in the first stage. Although it is possible to send X in the third stage, as illustrated in the embodiment shown in FIG. 12, such an approach would only protect the authentication key $\varphi$ with the state $\theta_A$. If the state of $\theta_A$ is ever discovered by Eve, the authentication key could be exposed since Eve could intercept $\Psi_1$ and could easily determine the authentication key, thereby potentially compromising security. In this preferred embodiment, information X via quantum state $\theta_X$ is always coupled with the authentication key $\varphi$, and the two are always sent together. As a result, Eve obtains no additional information about X or $\varphi$ alone, and even if Eve exposes the combined state of the authentication key $\varphi$ and quantum state $\theta_X$, Eve has no means to deduce the individual value of X or $\varphi$. Therefore, it should be noted that sending information X in the first stage coupled with authentication key $\varphi$ is a more secure option. It should also be noted that this protection of the authentication key $\varphi$ allows the key to be used repeatedly in multiple iterations of the process discussed, whereas other methods may require the authentication key to be changed in each iteration.

In some embodiments, including various embodiments discussed below, a number of photons used in each stage of the communication or the quantum channels should be kept below a threshold where the quantum state can be deterministically measured. Sending a beam that provides a number of photons above this threshold would destroy the security protection afforded by quantum states because providing sufficient photons for deterministic measurement would allow an eavesdropper to reveal the values of $\Psi_1$, $\Psi_2$ and $\Psi_3$ without being detected, thereby allowing Eve to relay the beam without being detected. In other words, states $\Psi_1$, $\Psi_2$ and $\Psi_3$ should be kept in quantum states where the quantum state cannot be measured deterministically, which only leaves nondeterministic measure options for the eavesdropper. By keeping the number of photons used for states $\Psi_1$, $\Psi_2$ and $\Psi_3$ below a threshold for deterministic measurement, the states cannot be measured by an eavesdropper without changing the quantum state of states $\Psi_1$, $\Psi_2$ and $\Psi_3$.

In the illustrative implementation described in FIG. 10A, X can only be recovered by Bob, who possesses a copy of the authentication key.

One objective of the improved systems and methods is not to directly encode quantum states using the authentication key. In other words, transmitted quantum states ($\Psi$) are never solely based on the authentication key ($\varphi$). Thus, when the authentication key is sent over quantum channel, the transmitted quantum state always includes additional information (e.g. other states $\theta$) that influence the transmitted quantum state, thereby preventing the authentication key from being measured, eavesdropped, subjected to man-in-the-middle attacks, or the like.

In some embodiments, quantum states can be realized using polarization of photons. In some embodiments, quantum states can be realized using quantum phase modulation of photons. In some embodiments, more than a single photon can be used in the communication. Because the quantum states transmitted on the quantum channels are non-orthogonal states, Eve's ability to obtain useful information is limited, even if a few photons are siphoned. However, the non-orthogonal states in the quantum channels are restricted so that the number of photons utilized is well under a threshold for deterministic measurement of the quantum state, e.g. below where polarization analyzers can be used to recover the polarization state. If this rule is violated, the protection provided from utilizing non-orthogonal states is destroyed.

In some embodiment, the authentication keys can be used to generate non-orthogonal quantum states. In some embodiments, non-orthogonal quantum states are generated using polarization of photons. In some embodiments, quantum states can be realized using quantum phase modulation of photons. In some embodiment, states are coupled (e.g. "+" sign in FIG. 10A) by rotating a photon's the polarization angles.

Figure 10B:
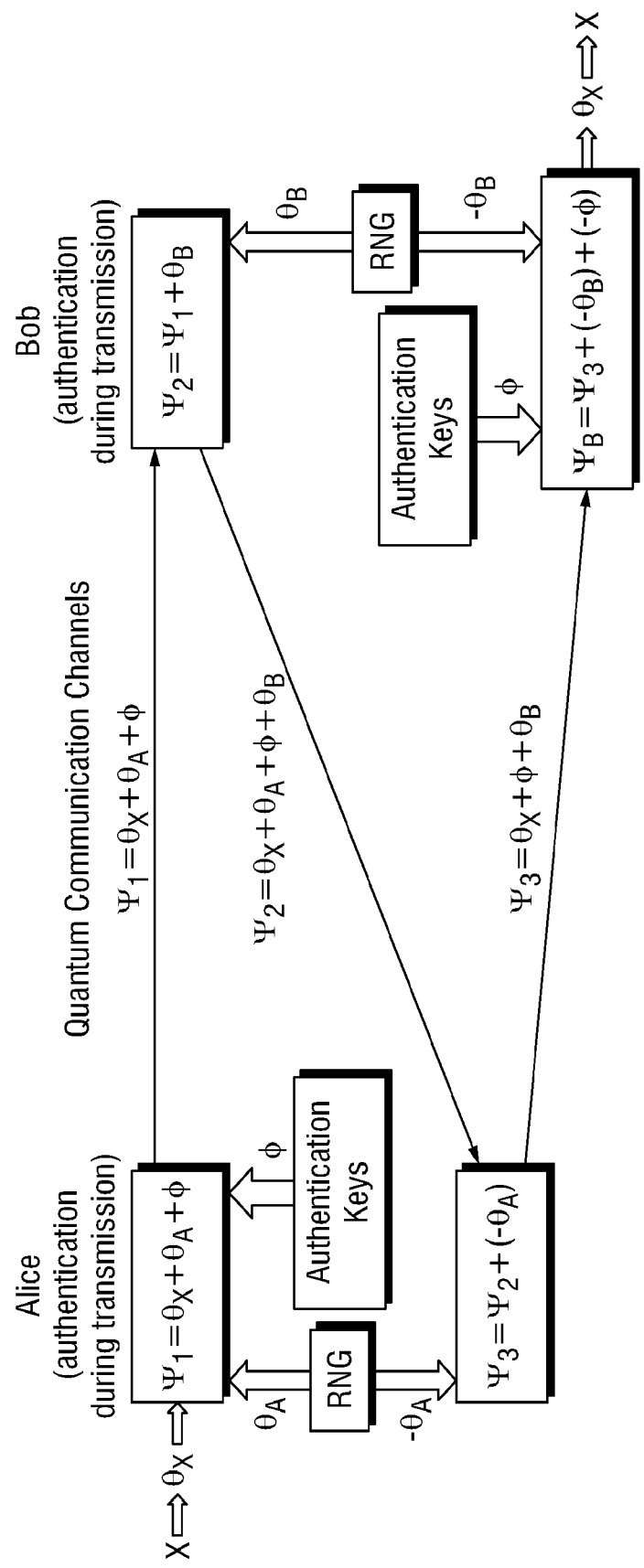
FIG. 10B is an illustrative implementation of authentication during transmission using quantum channels.

FIG. 10B is an illustrative implementation of the quantum states on the channel. The drawings the quantum states ($\Psi_0$, $\Psi_1$, $\Psi_2$) at each stage are illustrated, and the corresponding equations for the quantum states at each stage are also provided. Notably four variables are present ($\theta_X$, $\theta_A$, $\varphi$, $\theta_B$) in the equations. Thus, even if an eavesdropper Eve intercepts the quantum states provided at each stage, Eve will be unable to determine the values of the four variables and decode the information X. The authentication key is never exposed by itself on the quantum channel. X can only be decoded if Bob possesses the correct authentication key. Without knowing the authentication key, Eve cannot pretend to be Alice. This authentication can be done on a bit-by-bit basis, and thus preventing any man-in-the-middle attack.

Figure 11:
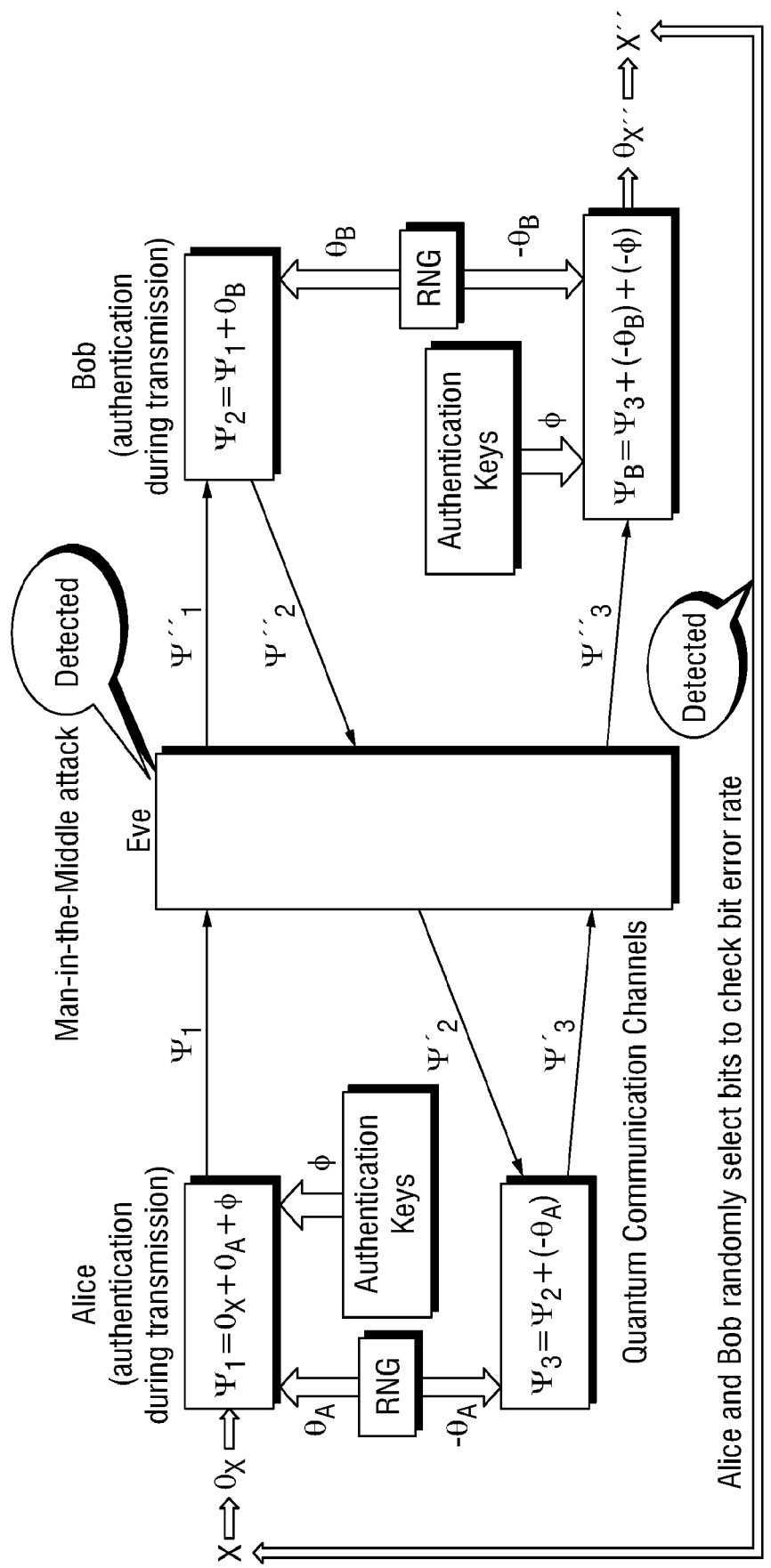
FIG. 11 is an illustrative implementation of detecting man-in-the-middle attack using authentication during transmission method.

FIG. 11 is an illustration of an attempted man-in-the-middle attack launched by Eve. Because Eve does not possess the authentication key, Eve cannot reliably act as Bob and obtain information X. In addition, Eve cannot reliably predict the non-orthogonal quantum states sent from Alice, and Eve's attack causes high bit error rate, which can be detected by randomly comparing bits between Alice and Bob to determine if a man-in-the-middle attack has been launched. In addition, Eve's attack may also cause increased noise on the quantum channel so noise can be monitored alone or in conjunction with the bit error rate to detect an attack. Since Eve cannot decode X reliably without the authentication key, the man-in-the-attack performed by Eve does not yield any useful information for Eve. The only effect of Eve's attack is disturbing the quantum state, thereby causing a higher bit error rate and channel noise. While this bit error check is shown for the embodiments discussed above, it shall be understood that such a bit error check and between Alice and Bob can also be performed for any of the other embodiments discussed herein. Similarly, other embodiments can also utilize quantum channel noise monitoring, either alone or in conjunction with the bit error check.

Figure 12:
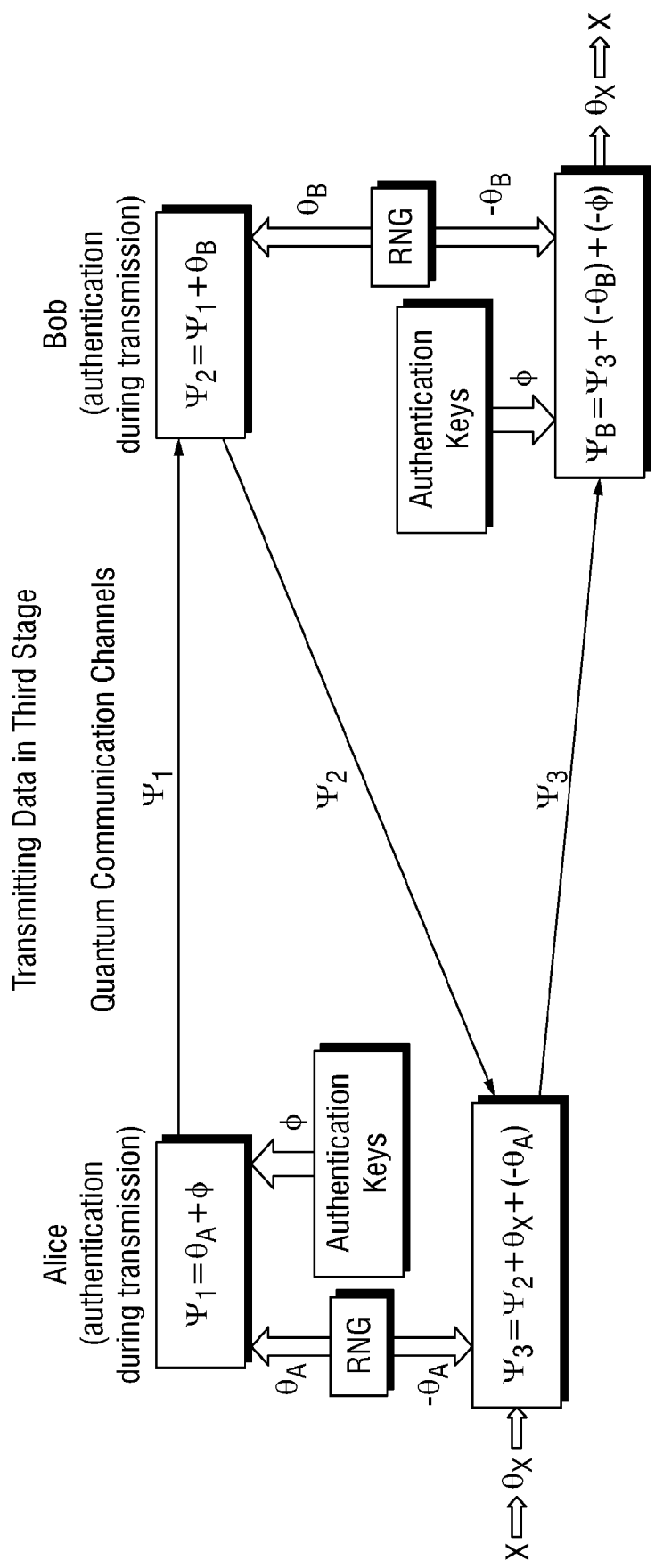
FIG. 12 is an illustrative implementation of transmitting data in the third stage using authentication during transmission method.

FIG. 12 is an illustrative implementation of an on-the-fly authentication scheme where information X is transmitted in the third stage. Again, without knowing the authentication key, Eve cannot retrieve any useful information. When used in direct data communication, this scheme protects data by allowing Alice and Bob to detect Eve utilizing any suitable means. If necessary or if eavesdropping by Eve is detected, Alice and Bob can abort the transmission in the first and second stages without the risk of exposing data.

As shown, Alice uses a random number generator (RNG) to generate a state of $\theta_A$. Alice couples $\theta_A$ with the authentication key $\varphi$, and generate quantum state $\Psi_1$. $\Psi_1$ is the quantum state transmitted by Alice on the quantum communication channel to Bob.

Bob, on receiving quantum state $\Psi_1$, obtains state $\theta_B$ from his random number generator. He couples received quantum state $\Psi_1$ with $\theta_B$, and generates quantum state $\Psi_2$. $\Psi_2$ is the quantum state transmitted from Bob to Alice.

Alice, on receiving quantum state $\Psi_2$, couples $\Psi_2$ with $\theta_X$ based on information X, and with ($-\theta_A$), and generates quantum state $\Psi_3$. Quantum state $\Psi_3$ is transmitted by Alice to Bob on the quantum channel.

Bob, on receiving quantum state $\Psi_3$, couples $\Psi_3$ with ($-\theta_B$), and ($-\varphi$), where $\varphi$ is the authentication key, and recovers quantum state $\theta_X$, and obtains the key or data X. As discussed previously, the authentication key can be used in multiple iterations of this process because of the protection provided. Further, the nondeterministic quantum channel may allow Bob to detect an eavesdropper using bit error checks or channel noise monitoring, which may trigger the failed authentication alarm.

Figure 13A:
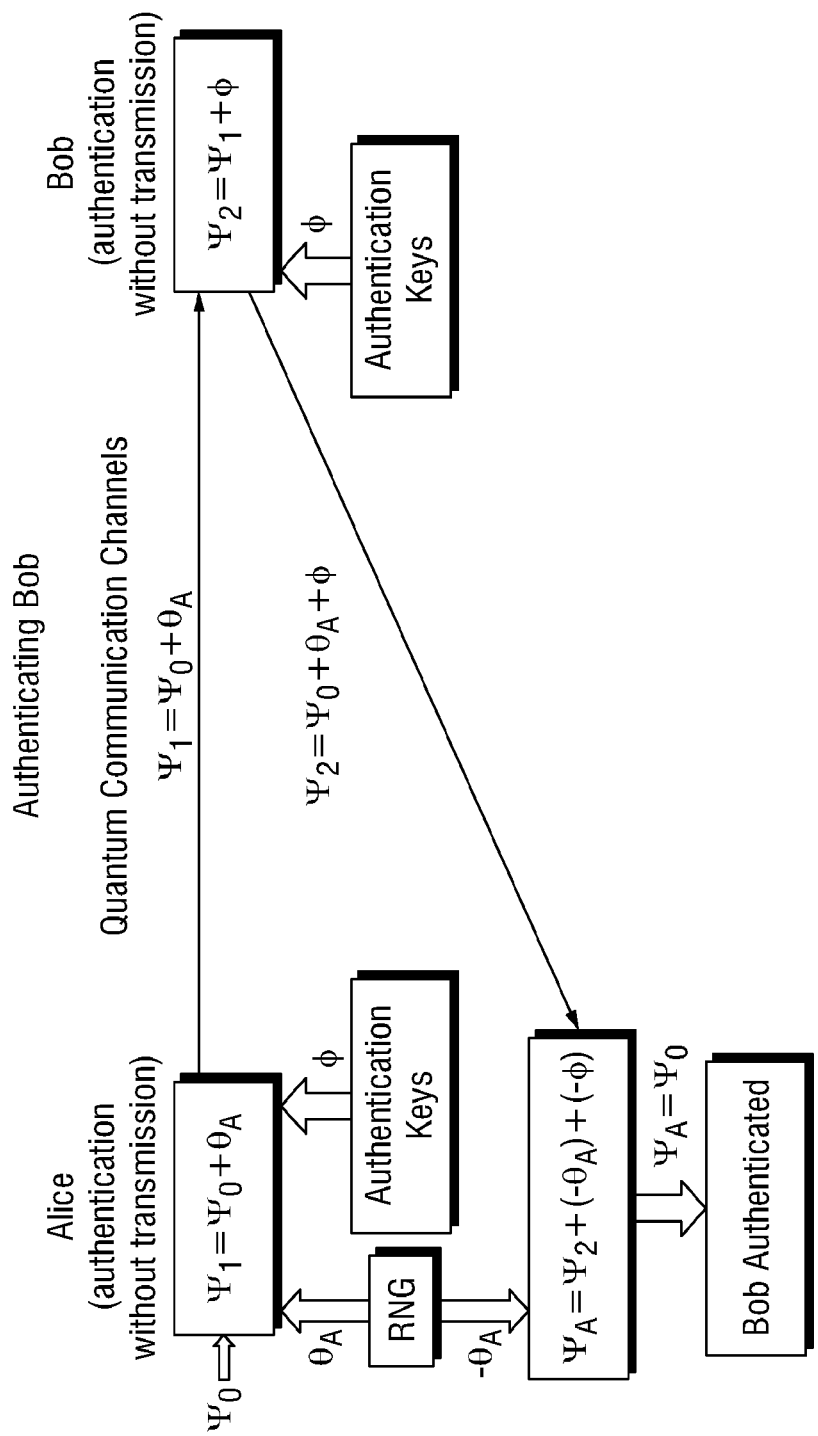
FIG. 13A is an illustrative implementation of authenticating receiver without transmitting data.

FIG. 13A is an illustrative implementation of authenticating Bob. Alice prepares a quantum state $\Psi_0$. She then uses a random number generator (RNG) to generate a state of $\theta_A$. Alice couples $\Psi_0$ with $\theta_A$, and generates quantum state $\Psi_1$. $\Psi_1$ is the quantum state transmitted by Alice on the quantum communication channel to Bob.

Bob, on receiving quantum state $\Psi_1$, couples received quantum state $\Psi_1$ with authentication key $\varphi$, and generates quantum state $\Psi_1$. $\Psi_2$ is the quantum state transmitted from Bob to Alice.

Alice, on receiving quantum state $\Psi_2$, couples $\Psi_2$ with ($-\theta_A$), along with authentication key ($-\varphi$), and generates quantum state $\Psi_A$. If $\Psi_A$ equals the original state $\Psi_0$, Bob is authenticated. Otherwise, if $\Psi_A$ does not equal the original state $\Psi_0$, Eve is detected. In some embodiments, an alarm may be generated if the quantum state $\Psi_A$ is not equal to the original state $\Psi_0$ to indicate authentication has failed. Because the number of photons is under the threshold for deterministic measurement, Eve cannot obtain the two equations $\Psi_1=\Psi_0+\theta_B$ and $\Psi_2=\Psi_0+\theta_B+\varphi$. Further, even if Eve was somehow able to obtain the abovenoted equations, three variables $\Psi_0$, $\theta_B$, and $\varphi$ are present, thereby making it difficult or impossible to determine the value the authentication key $\varphi$. As discussed previously, the authentication key can be used in multiple iterations of this process because of the protection provided. Further, the nondeterministic quantum channel may allow Alice to detect an eavesdropper using bit error checks or channel noise monitoring, which may trigger the failed authentication alarm.

Figure 13B:
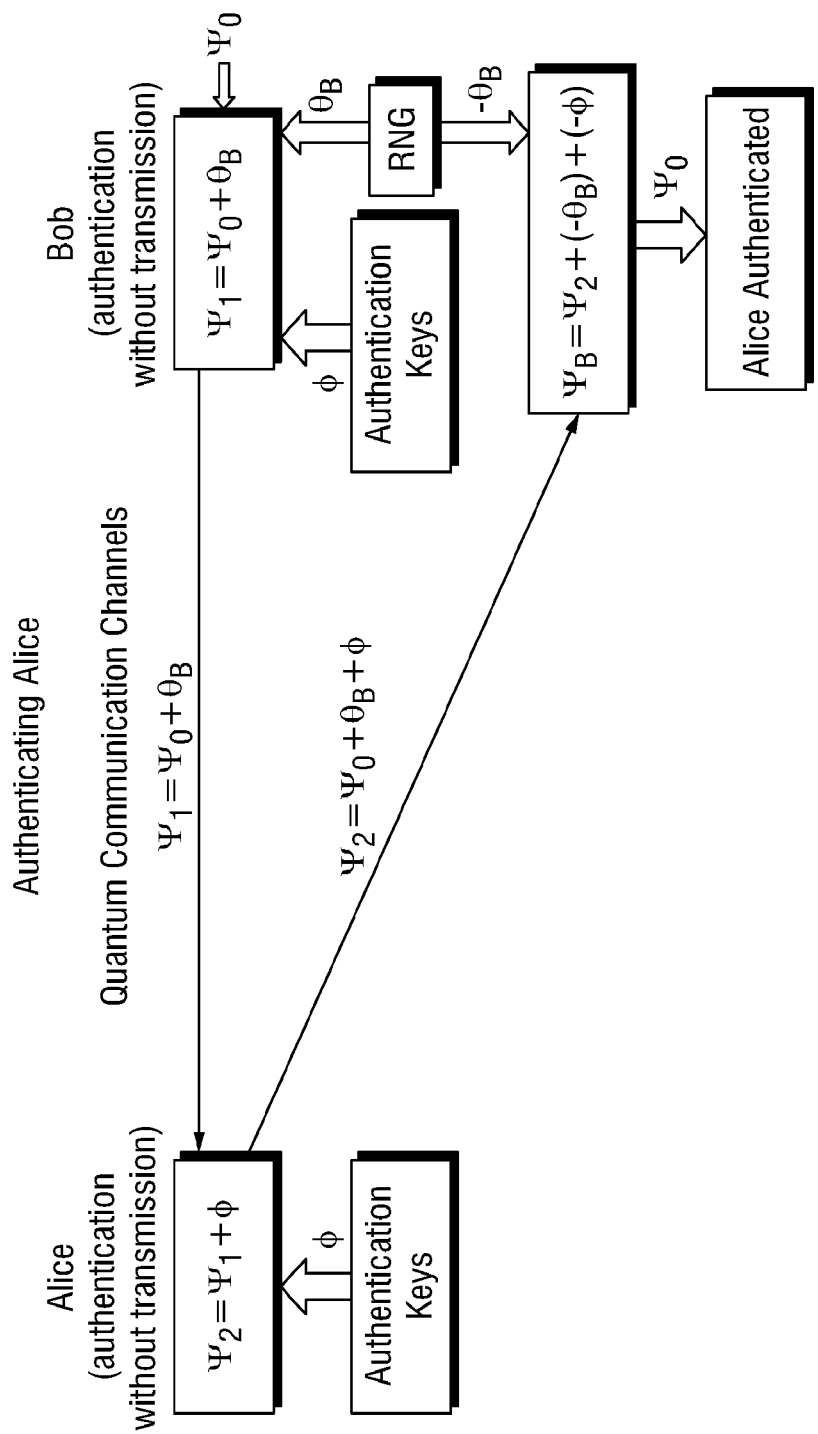
FIG. 13B is an illustrative implementation of authenticating sender without transmitting data.

FIG. 13B is an illustrative implementation of authenticating Alice. Bob prepares a quantum state $\Psi_0$. He then uses a random number generator (RNG) to generate a state of $\theta_B$. Bob couples $\Psi_0$ with $\theta_B$, and generates quantum state $\Psi_1$. $\Psi_1$ is the quantum state transmitted by Bob on the quantum communication channel to Alice.

Alice, on receiving quantum state $\Psi_1$, couples received quantum state $\Psi_1$ with authentication key $\varphi$, and generates quantum state $\Psi_2$. $\Psi_2$ is the quantum state transmitted from Alice to Bob.

Bob, on receiving quantum state $\Psi_2$, couples $\Psi_2$ with $(-\theta_B)$, along with authentication key $(-\varphi)$, and generates quantum state $\Psi_B$. If $\Psi_B$ equals the original state $\Psi_0$, Alice is authenticated. Otherwise, if $\Psi_B$ does not equal the original state $\Psi_0$, Eve is detected. In some embodiments, an alarm may be generated if the quantum state $\Psi_B$ is not equal to the original state $\Psi_0$ to indicate authentication has failed. As discussed previously, the authentication key can be used in multiple iterations of this process because of the protection provided. Further, the nondeterministic quantum channel may allow Bob to detect an eavesdropper using bit error checks or channel noise monitoring, which may trigger the failed authentication alarm.

Figure 14:
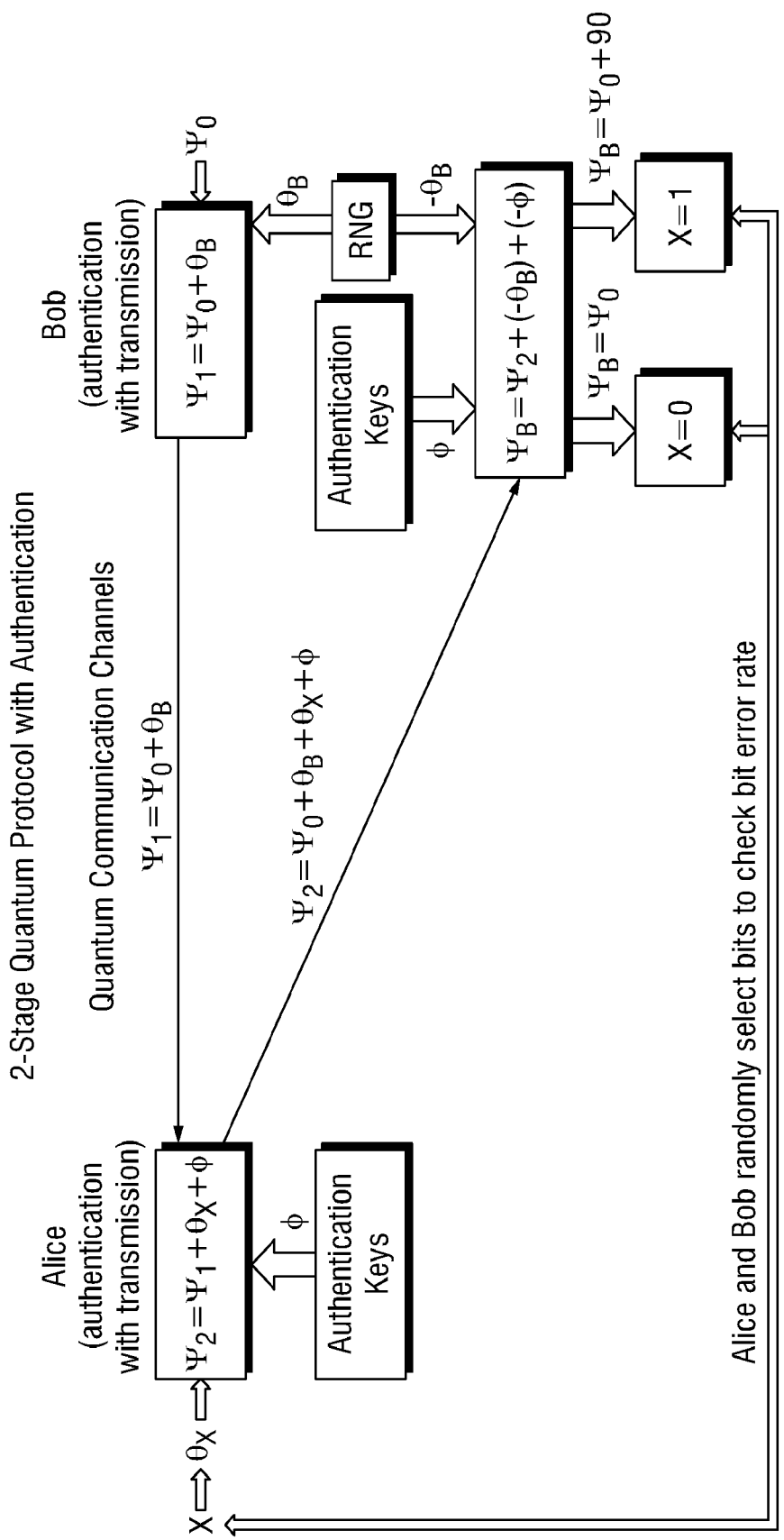
FIG. 14 is an illustrative implementation of a 2-stage quantum protocol with authentication.

FIG. 14 is an illustrative implementation of a 2-stage quantum cryptography protocol with on-the-fly authentication.

Bob prepares a random quantum state $\Psi_0$. In one embodiment, quantum state $\Psi_0$ is Bob's private orthogonal base that is not shared with Alice or any third-party. In another embodiment, Bob chooses a different random quantum state $\Psi_0$ for each bit transfer. He then uses a random number generator (RNG) to generate a state of $\theta_B$. Bob couples $\Psi_0$ with $\theta_B$, and generates quantum state $\Psi_1$. $\Psi_1$ is the quantum state transmitted by Bob on the quantum communication channel to Alice.

Alice, on receiving quantum state $\Psi_1$, couples received quantum state $\Psi_1$ with $\theta_X$ based on information X and authentication key $\varphi$, and generates quantum state $\Psi_2$. $\Psi_2$ is the quantum state transmitted from Alice to Bob.

Bob, on receiving quantum state $\Psi_2$, couples $\Psi_2$ with $(-\theta_B)$, along with authentication key $(-\varphi)$, and generates quantum state $\Psi_B$. Since Bob possesses the original quantum state $\Psi_0$, $\theta_X$ can be recovered by coupling $\Psi_B$ with $(-\Psi_0)$, thus recovering information X. In another embodiment, information X can be recovered by using $\Psi_0$ as the orthogonal base to measure $\Psi_B$. If $\Psi_B$ equals the original state $\Psi_0$, X is recovered as 0, and if $\Psi_B$ equals the original state $\Psi_0+90$, X is recovered as 1. Alice and Bob may randomly select bits to check the bit error rate. If the bit error rate is higher than an acceptable rate, the process is aborted and tried again later. In some embodiments, if the bit error rate exceeds an acceptable rate, an alarm is triggered to indicate authentication has failed. Because Eve does not possess the authentication key, Eve has no ability to gain meaningful information since the two equations for $\Psi_1$ and $\Psi_2$ provide four unknown variables. As discussed previously, the authentication key can be used in multiple iterations of this process because of the protection provided. Further, the nondeterministic quantum channel may allow Bob to detect an eavesdropper using bit error checks or channel noise monitoring, which may trigger the failed authentication alarm.

Figure 15:
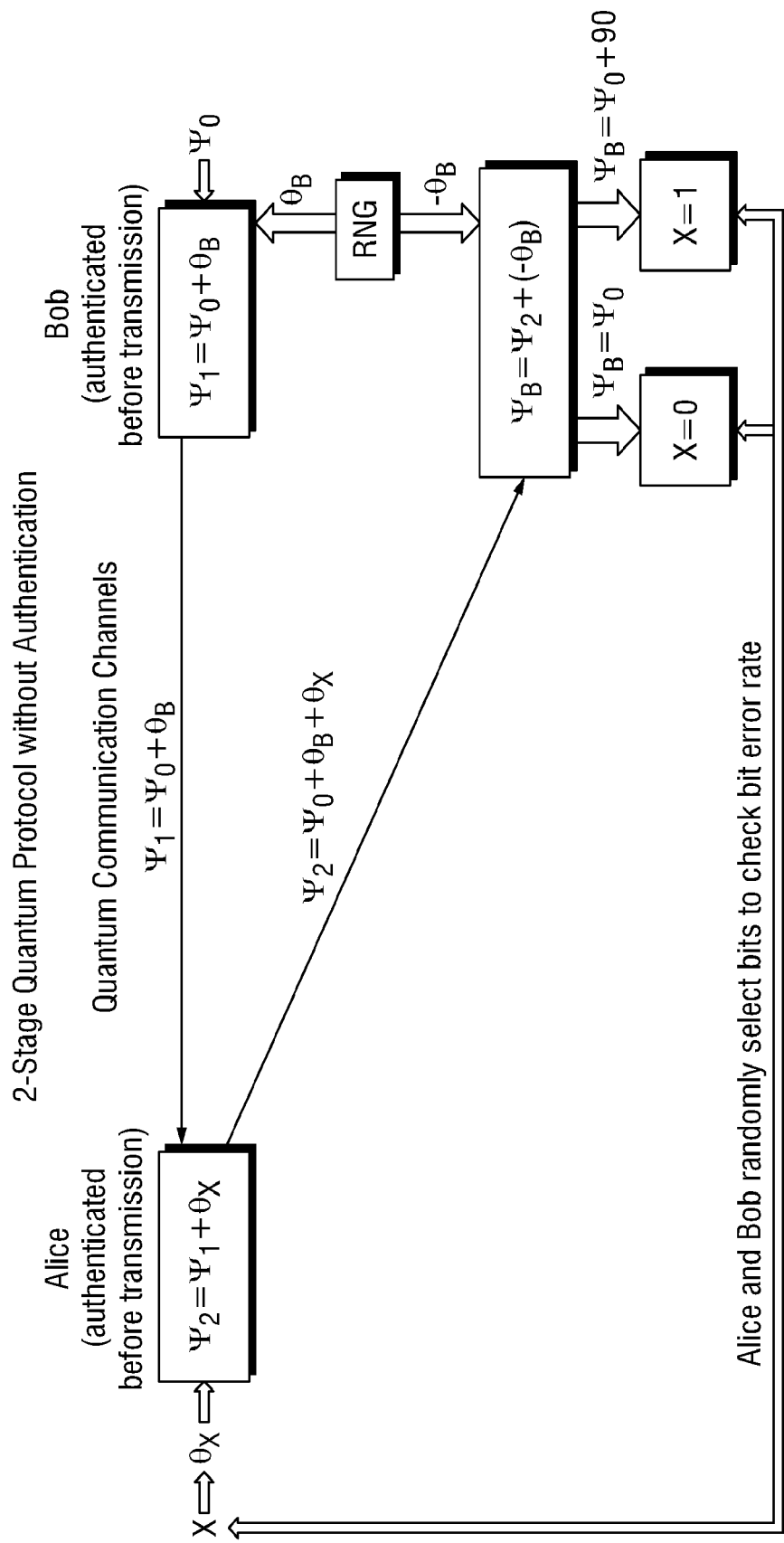
FIG. 15 is an illustrative implementation of a 2-stage quantum protocol without authentication.

FIG. 15 is an illustrative implementation of a 2-stage quantum cryptography protocol without on-the-fly authentication. Alice and Bob are assumed to be authenticated prior to the communication using methods described earlier or any other conventional means.

Bob prepares a random quantum state $\Psi_0$. In one embodiment, quantum state $\Psi_0$ is Bob's private orthogonal base that is not shared with Alice or any third-party. In another embodiment, Bob chooses a different random quantum state $\Psi_0$ for each bit transfer. He then uses a random number generator (RNG) to generate a state of $\theta_B$. Bob couples $\Psi_0$ with $\theta_B$, and generates quantum state $\Psi_1$. $\Psi_1$ is the quantum state transmitted by Bob on the quantum communication channel to Alice.

Alice, on receiving quantum state $\Psi_1$, couples received quantum state $\Psi_1$ with $\theta_X$ based on information X, and generates quantum state $\Psi_2$. $\Psi_2$ is the quantum state transmitted from Alice to Bob. In contrast to the prior 2-stage quantum protocol with authentication, it should be noted that Alice does not utilize an authentication key when generating quantum state $\Psi_2$.

Bob, on receiving quantum state $\Psi_2$, couples $\Psi_2$ with $(-\theta_B)$, and generates quantum state $\Psi_B$. Since Bob possesses the original quantum state $\Psi_0$, $\theta_X$ can be recovered by coupling $\Psi_B$ with $(-\Psi_0)$, thus recovering information X. In another embodiment, information X can be recovered by using $\Psi_0$ as the orthogonal base to measure $\Psi_B$. If $\Psi_B$ equals the original state $\Psi_0$, X is recovered as 0, and if $\Psi_B$ equals the original state $\Psi_0+90$, X is recovered as 1. Alice and Bob randomly select bits to check the bit error rate. If the bit error rate is higher than normal, the process is aborted and tried again later. In some embodiments, if the bit error rate exceeds an acceptable rate, an alarm is triggered to indicate authentication has failed. As discussed previously, the nondeterministic quantum channel may allow Bob to detect an eavesdropper using bit error checks or channel noise monitoring, which may trigger the failed authentication alarm.

Figure 16:
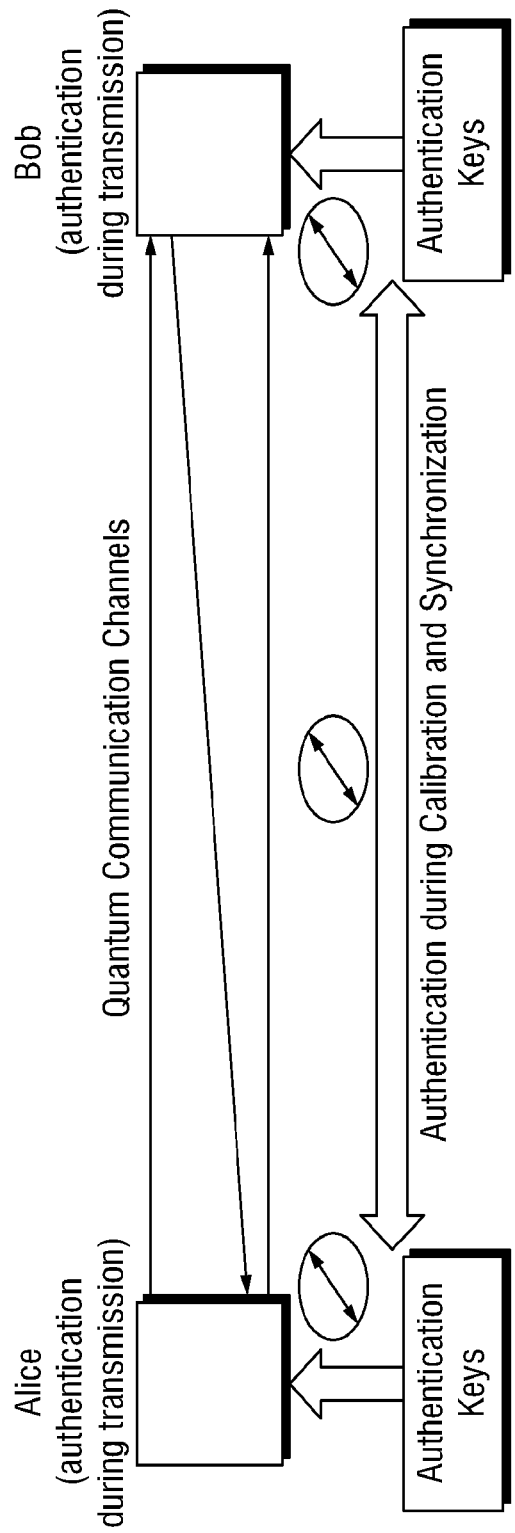
FIG. 16 is an illustrative implementation of using quantum authentication during calibration and time synchronization.

FIG. 16 is an illustrative implementation of using the in-channel authentication schemes illustrated earlier while performing quantum channel calibration and synchronization. This would avoid Eve attacking the channel to generate false synchronization information. The oval shaped symbol shown represents coupling the authentication method with timing information and other calibration measurement data.

Figure 17:
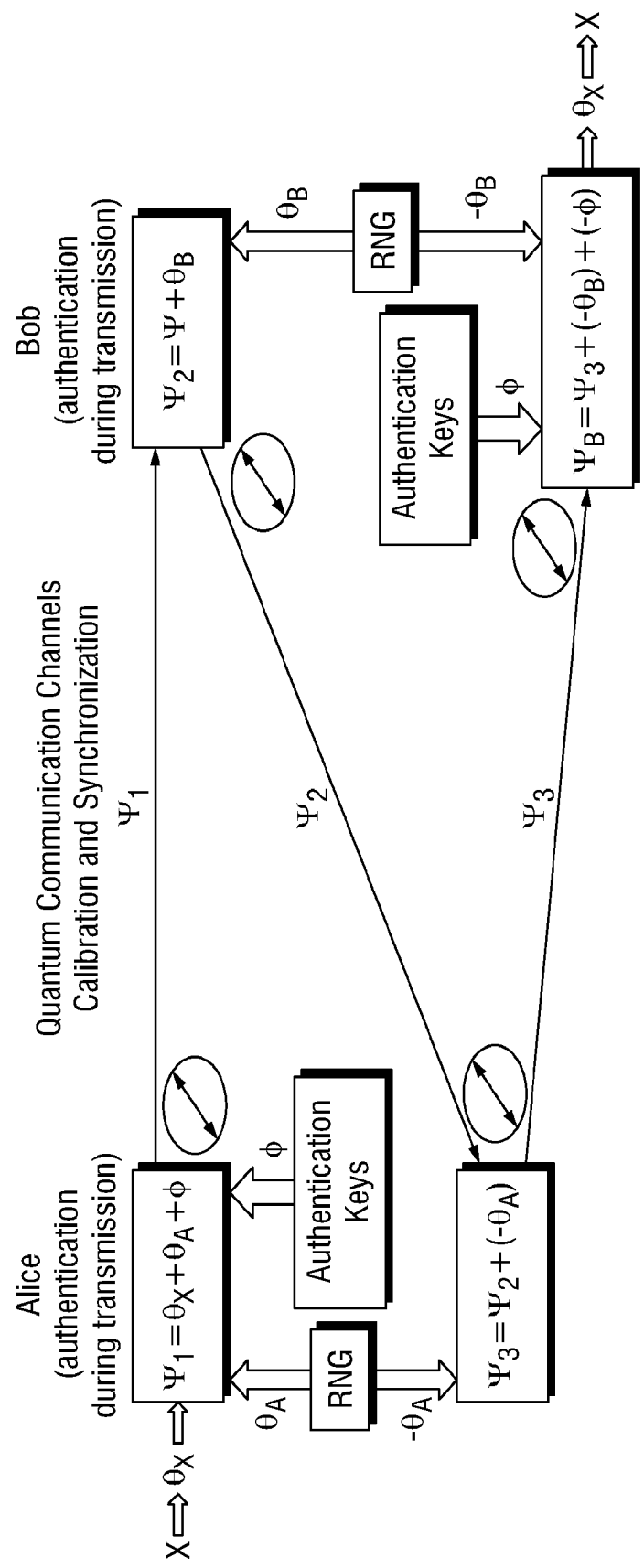
FIG. 17 is an illustrative implementation of operations for quantum authentication during calibration and time synchronization.

FIG. 17 is an illustrative implementation of transmitting authenticated data using the calibration and synchronization process to avoid Eve to perform man-in-the-middle attack.

Figure 18:
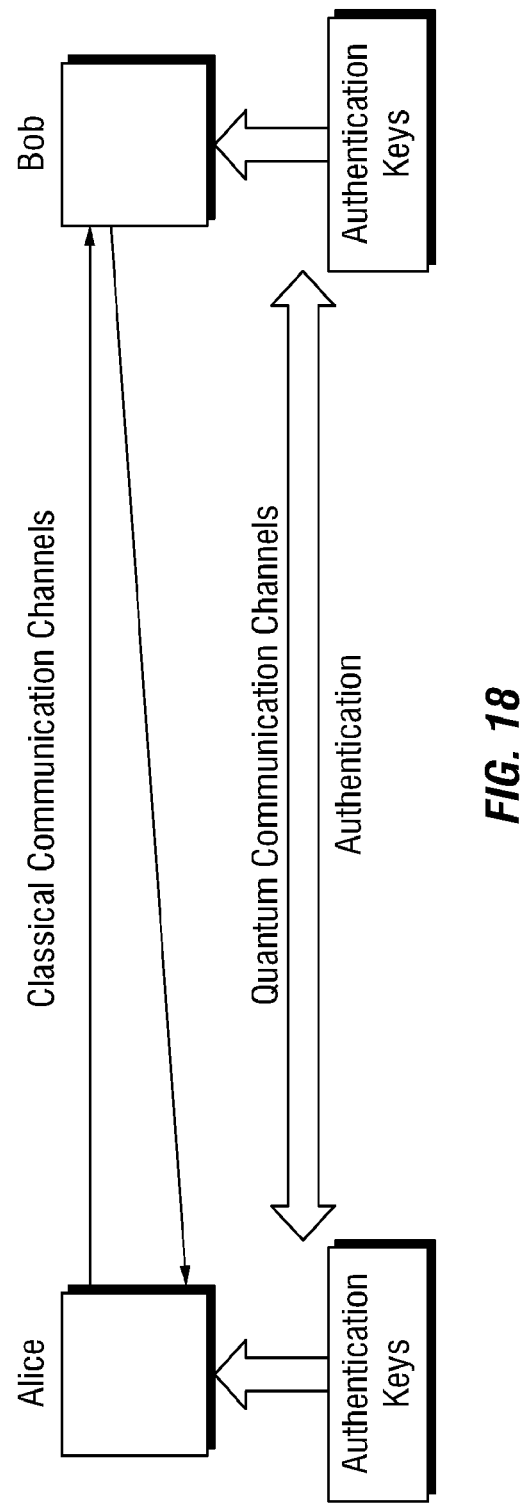
FIG. 18 is an illustrative implementation of using quantum channels to authenticate and using classical channels to communicate.

FIG. 18 is an illustrative implementation of authenticating Alice and Bob using quantum communication channels while using classical communications for some other communication.

Figure 19:
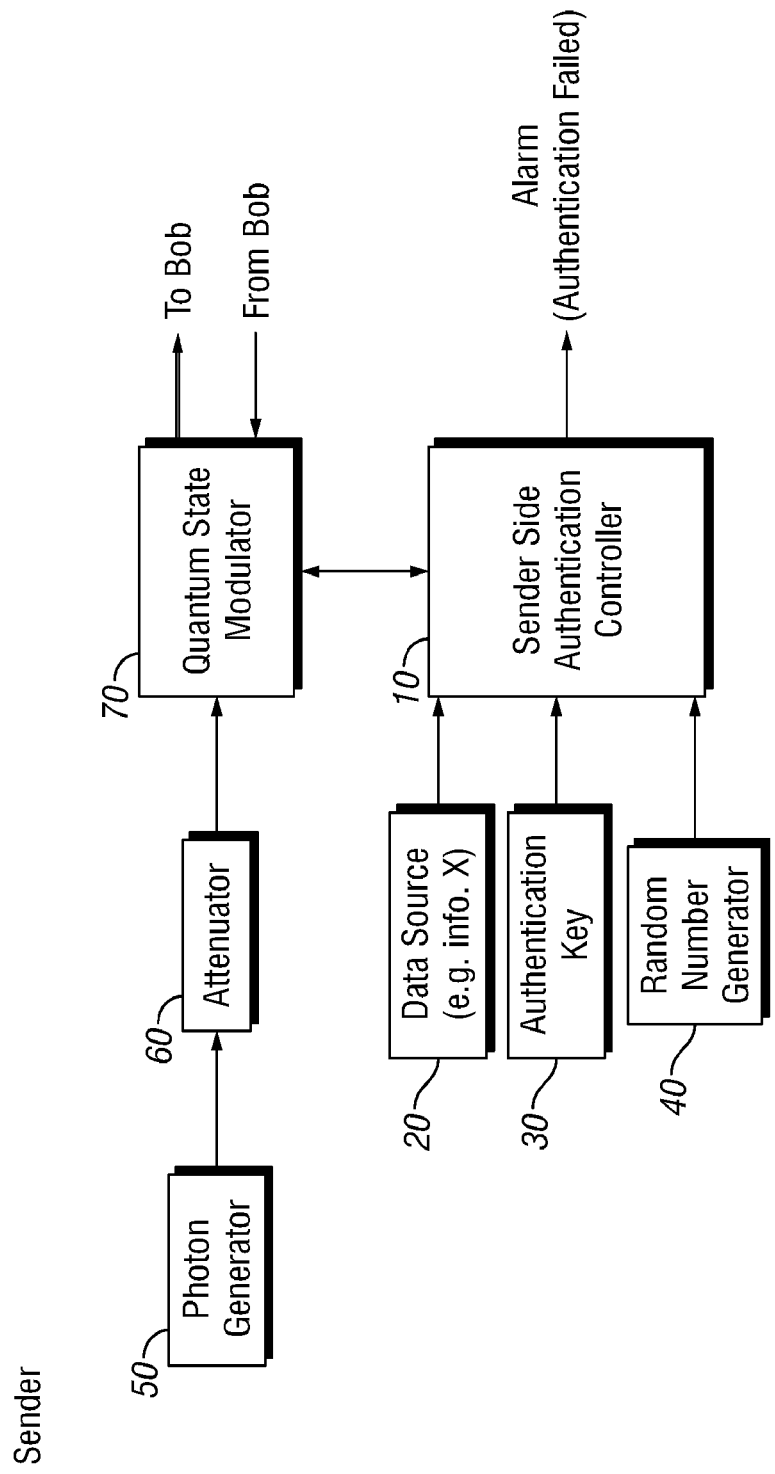
FIG. 19 is an illustrative implementation of a sender side quantum authentication system.

FIG. 19 is illustrative implementation of a sender side quantum authentication system or a party to be authenticated. The key component of the quantum authentication system is the sender side authentication controller 10, which can be implemented using a processor including, but not limited to, a microprocessor, FPGA (Field Programmable Gate Array or ASIC), or the like. The sender side authentication controller 10 obtains a combination of inputs from a data source (e.g. data information X) 20, the authentication key 30, or a random number generator 40. For example, it should be apparent from the embodiments discussed above (e.g. FIGS. 10A-10B, 12, 13A-13B, 14, and 15) that the combination of inputs may comprise the inputs necessary to generate quantum states $\Psi_0$, $\Psi_1$, $\Psi_2$, or $\Psi_3$ outputted by the quantum state modulator 70 in accordance with the formulas provided. Nonlimiting examples may include $\theta_X+\theta_{A\ or\ B}+\varphi$; $\theta_X+\theta_{A\ or\ B}+\varphi+\theta_{B\ or\ A}$; $\Psi_0+\theta_{A\ or\ B}$; $\Psi_0+\theta_{A\ or\ B}+\varphi$; $\Psi_0+\theta_{A\ or\ B}+\theta_X+\varphi$; or $\Psi_0+\theta_{A\ or\ B}+\theta_X$. Further, while the examples shown in FIGS. 19-22 refer to Alice as the sender and Bob as the receiver, in other embodiments Bob may be the sender and Alice may be the receiver.

A photon generator 50 may be coupled to an attenuator 60 that outputs to a quantum state modulator 70. Based on the inputs received from data information X 20, the authentication key 30, a random number generator 40, or a combination thereof, the sender side authentication controller 10 may compute the proper polarization angle or quantum phase needed to control the quantum state modulator 70 to output a desired quantum state $\Psi_0$, $\Psi_1$, $\Psi_2$, or $\Psi_3$ in accordance with the previously discussed embodiments. In accordance with the inputs received, the sender side authentication controller 10 may provide a control signal that controls the desired quantum state outputted by the quantum state modulator 70. Depending on the mode the system operates in, authentication controller 10 can also authenticate the receiver by evaluating the information sent from Bob to the quantum state modulator 70. If any abnormal situation is detected, the authentication controller 10 may generate an alarm signal to indicate that the receiver does not pass the authentication. In some embodiments, the detection of abnormal situations (e.g. high bit error rate, high channel noise, or both) may cause the sender side authentication system to cease communication with the receiver, notify the receiver that authentication has failed, or both. In the optical path, the photon generator 50 passes an attenuator 60 to limit the number of photons to be used during communication so that it is below a threshold for deterministic measurement of quantum state. The quantum state modulator 70 modulates the optical signal from the attenuator 60 to a non-orthogonal quantum state in accordance with instructions from the authentication controller 10.

Figure 20:
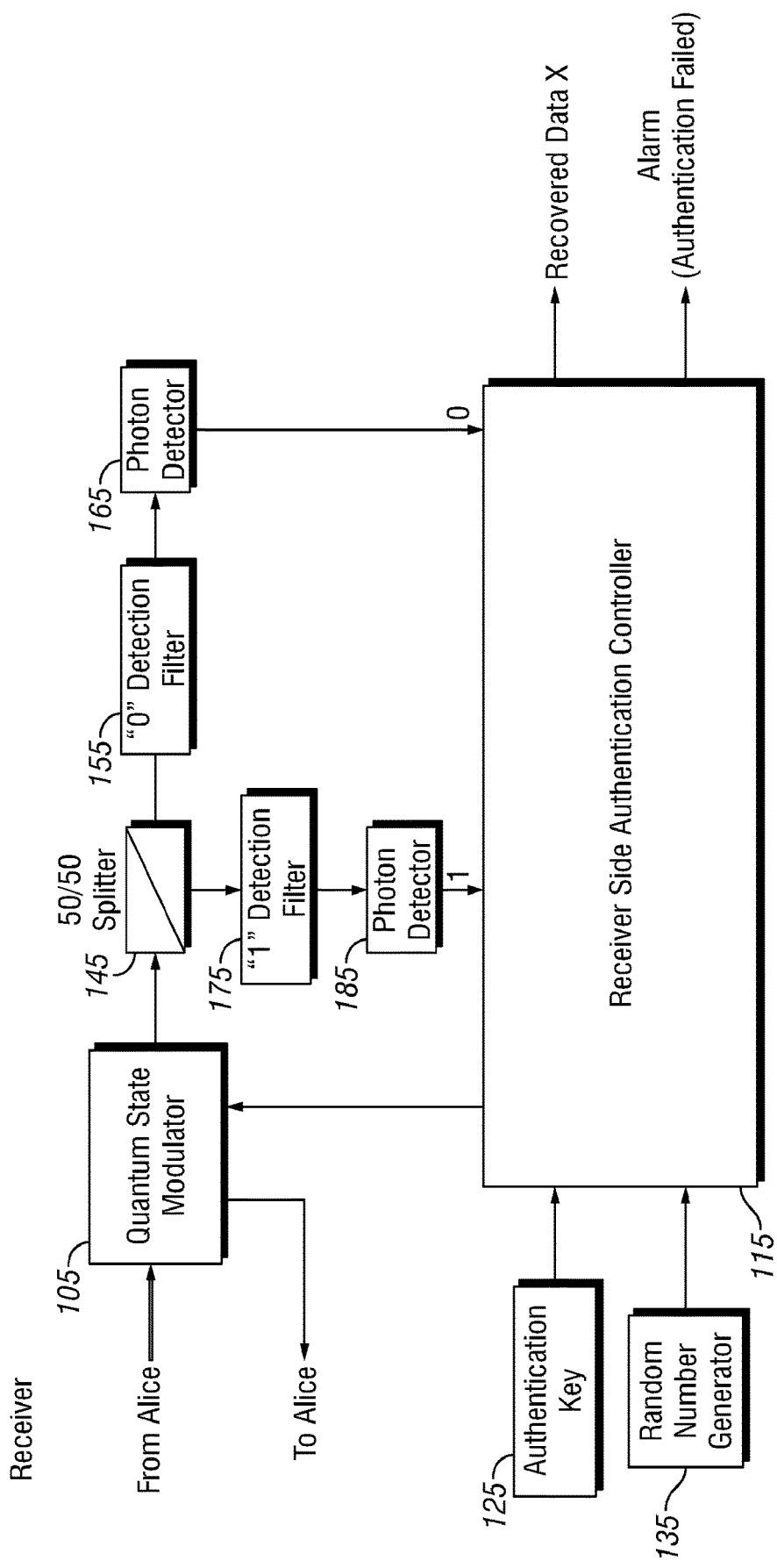
FIG. 20 is an illustrative implementation of a receiver side quantum authentication system.

FIG. 20 is an illustrative implementation of a receiver side quantum authentication system or an authenticating party. The received optical signals are modulated with a quantum state modulator 105 in accordance with instructions from the receiver side authentication controller 115 to output a desired quantum state. For example, it should be apparent from the embodiments discussed above (e.g. FIGS. 10A-10B, 12, 13A-13B, 14, and 15) that the quantum states $\Psi_0$, $\Psi_1$, $\Psi_2$, or $\Psi_3$ that are expected to be received may require coupling to $-\theta_B$, $-\varphi$, and/or $-\theta_A$, which are provided by authentication key 125 or random number generator 135, to determine the desired quantum state $\Psi_{A\ or\ B}$. Nonlimiting examples may include $\theta_X+\theta_B+(-\theta_B)+(-\varphi)$; $\Psi_0+\theta_{A\ or\ B}+\varphi+(-\theta_{A\ or\ B})+(-\varphi)$; $\Psi_0+\theta_{A\ or\ B}+\theta_X+\varphi+(-\theta_{A\ or\ B})+(-\varphi)$; or $\Psi_0+\theta_{A\ or\ B}+\theta_X+(-\theta_{A\ or\ B})$. Then the desired quantum state outputted from the quantum state modulator 105 is split into a first and second output with an optical splitter 145 so that the outputs can respectively be direct to two paths: one for detecting "0", and one for detecting "1". For example, quantum state module 105 may output to 50/50 splitter 145 that outputs to first path for detecting "0" with a "0" detection filter 155 and photon detector 165. The 50/50 splitter 145 also outputs to a second path for detecting "1" with a "1" detection filter 175 and photon detector 185. In addition to providing functionality similar to the sender side system, the receiver side authentication controller 115 recovers data information X. Further, authentication controller may also monitor the bit error rate of the received data while recovering data information X. If any abnormal situation or operations are detected, such as a higher than expected bit error rate or channel noise, the receiver side authentication controller 115 generates the alarm to indicate that the authentication of the sender fails. In some embodiments, the detection of abnormal situation may cause the receiver side authentication system to cease communication with the sender, notify the sender that authentication has failed, or both.

Figure 21:
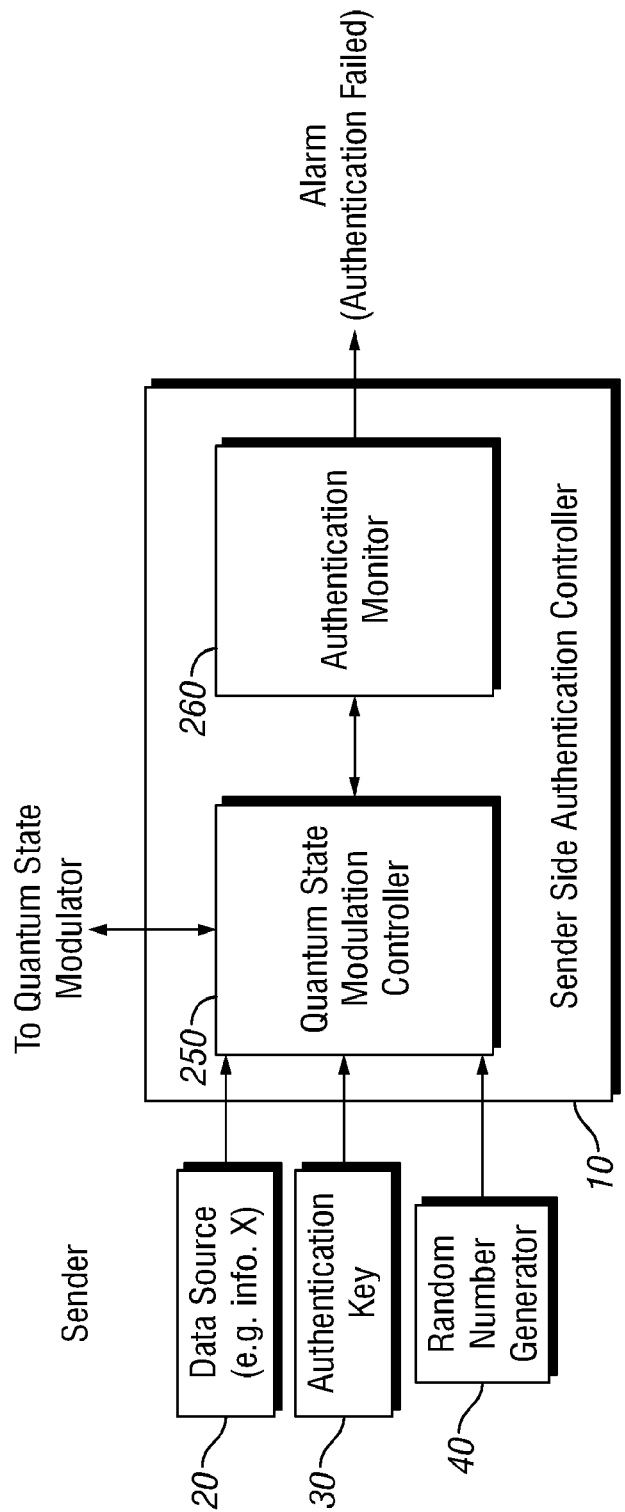
FIG. 21 is an illustrative implementation of a sender side authentication controller.

FIG. 21 is an illustrative implementation of detailed view of a sender side authentication controller 10 coupled to a data source X 20, an authentication key 30 and random number generator (RNG) 40. The quantum state modulation controller 250 may determine a desired quantum state $\Psi_0$, $\Psi_1$, $\Psi_2$, or $\Psi_3$ to be outputted in accordance with the combination of inputs received from data source 20, authentication key 30, and/or RNG 40, and the quantum state modulation controller generates proper outputs to control the quantum state modulator as desired to output the desired quantum state $\Psi_0$, $\Psi_1$, $\Psi_2$, or $\Psi_3$ according to the embodiments discussed above. The authentication monitor 260 is used for receiver authentication, and generates an alarm if the receiver does not pass the authentication test. The authentication monitor 260 obtains quantum state monitoring measurements from the quantum state controller 250, and authenticates the receiver if such an optional feature is enabled. When the authentication fails, the authentication monitor 260 generates an alarm, as well as a control signal to the quantum state modulation controller 250 to cease the communication.

Figure 22:
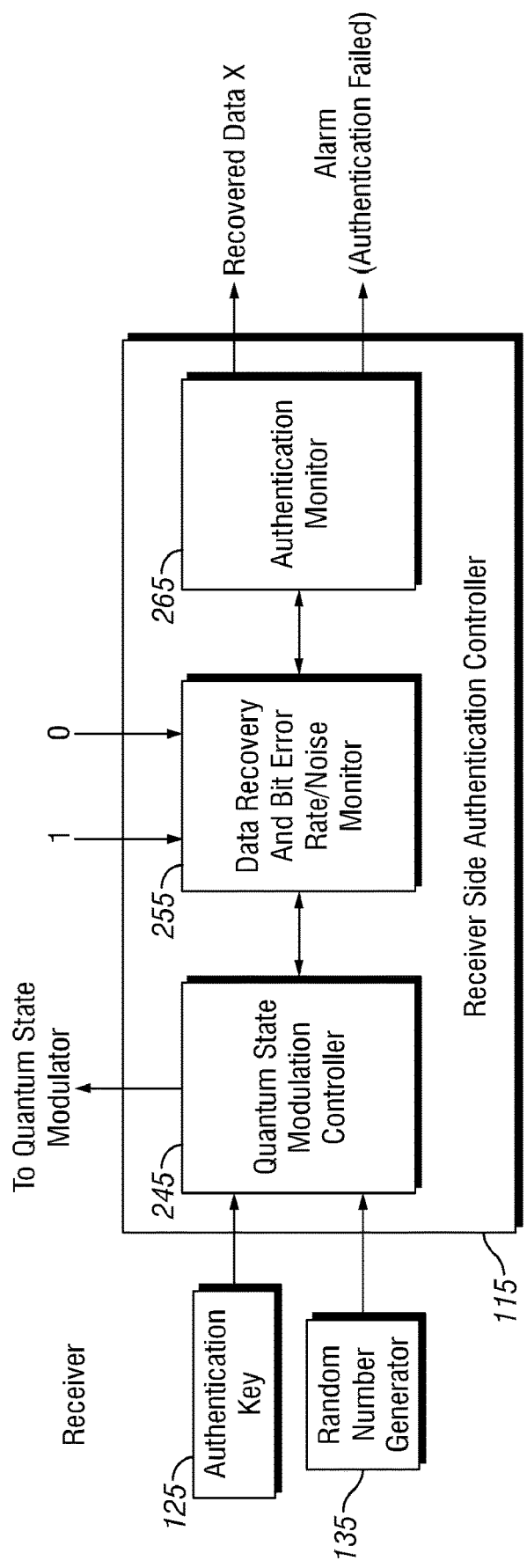
FIG. 22 is an illustrative implementation of a receiver side authentication controller.

FIG. 22 is an illustrative implementation of a detailed view of a receiver side authentication controller 115 coupled to authentication key 125 and random number generator 135. The quantum state modulation controller 245 may determine a desired quantum state $\Psi_A$ or $\Psi_B$ in accordance with the combination of inputs received from the authentication key 30, and/or RNG 40, and the quantum state modulation controller generates a control signal provided to control the quantum state modulator 105 as desired to process the quantum states $\Psi_0$, $\Psi_1$, $\Psi_2$, or $\Psi_3$ received in accordance with the embodiments discussed above, thereby causing the quantum state modulator to output a desired quantum state. The data recovery and bit error rate/noise monitor module 255 may be coupled to the outputs of the photon detectors 165, 185 to retrieve the received data information X. The "0" input and "1" input to data recovery and bit error rate/noise monitor 255 are continuously monitored. The bit error rate/noise monitor 255 may monitor the bit error rate or the channel noise to determine whether they exceed a predetermined rate, and may notify the authentication monitor 265 if the predetermined rate is exceeded. The information is then passed to the authentication monitor 265. If any abnormal operation is detected, the authentication monitor 265 module generates an alarm to indicate that the sender does not pass the authentication test. In a normal operation, the recovered data X is generated.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. A method for communicating using a quantum protocol, the method comprising:
   preparing a first quantum state $\Psi_0$, wherein the first quantum state $\Psi_0$ is randomly selected and not shared with any third party;
   generating a random quantum state $\theta$ with a random number generator;
   coupling the first quantum state $\Psi_0$ with the random quantum state $\theta$ to generate a second quantum state $\Psi_1$;
   transmitting the second quantum state $\Psi_1$ to a desired party; and
   receiving a third quantum state $\Psi_2$ from the desired party after transmitting the second quantum state $\Psi_1$,
   wherein the third quantum state $\Psi_2$ is equal to the second quantum state $\Psi_1$ coupled with an authentication key $\varphi$ and a quantum state $\theta_x$, wherein the quantum state $\theta_x$ is prepared based on information X; or
   the third quantum state $\Psi_2$ is equal to the second quantum state $\Psi_1$ coupled with the quantum state $\theta_x$, wherein the quantum state $\theta_x$ is prepared based on the information X; or
   the third quantum state $\Psi_2$ is equal to the second quantum state $\Psi_1$ coupled with the authentication key $\varphi$.

2. The method of claim 1, when the third quantum state $\Psi_2$ is equal to the second quantum state $\Psi_1$ coupled with the authentication key $\varphi$ and the quantum state $\theta_x$, further comprising the step of coupling the third quantum state $\Psi_2$ with a negative of the random quantum state $\theta$ and a negative of the authentication key $\varphi$ to generate a fourth quantum state $\Psi_B$ to recover the information X.

3. The method of claim 2, further comprising utilizing the first quantum state $\Psi_0$ as an orthogonal base to measure the fourth quantum state $\Psi_B$.

4. The method of claim 1, when the third quantum state $\Psi_2$ is equal to the second quantum state $\Psi_1$ coupled with the quantum state $\theta_x$, further comprising the step of coupling the third quantum state $\Psi_2$ with a negative of the random quantum state $\theta$ to generate a fourth quantum state $\Psi_B$ to recover the information X.

5. The method of claim 1, wherein the first quantum state $\Psi_0$ is different for each bit transmitted.

6. The method of claim 1, further comprising randomly selecting bits to check a bit error rate.

7. The method of claim 1, when the third quantum state $\Psi_2$ is equal to the second quantum state $\Psi_1$ coupled with the authentication key $\varphi$, further comprising the step of coupling the third quantum state $\Psi_2$ with a negative of the random quantum state $\theta$ and a negative of the authentication key $\varphi$ to generate a fourth quantum state, wherein the desired party is authenticated if the fourth quantum state is equal to the first quantum state $\Psi_0$.

8. The method of claim 7, wherein an alarm is triggered to indicate authentication has failed if the fourth quantum state is not equal to the first quantum state $\Psi_0$.

9. A method for communicating using a quantum protocol, the method comprising:
   receiving a second quantum state $\Psi_1$ from a desired party, wherein the second quantum state $\Psi_1$ is equal to a first quantum state $\Psi_0$ coupled with a random quantum state $\theta$,
   where the first quantum state $\Psi_0$ is randomly selected and not shared with any third party,
   the random quantum state $\theta$ is generated with a random number generator; and
   transmitting a third quantum state $\Psi_2$ to the desired party after receiving the second quantum state $\Psi_1$,
   wherein the third quantum state $\Psi_2$ is equal to the second quantum state $\Psi_1$ coupled with an authentication key $\varphi$ and a quantum state $\theta_x$, wherein the quantum state $\theta_x$ is prepared based on information X; or
   the third quantum state $\Psi_2$ is equal to the second quantum state $\Psi_1$ coupled with a quantum state $\theta_x$, wherein the quantum state $\theta_x$ is prepared based on information X; or
   the third quantum state $\Psi_2$ is equal to the second quantum state $\Psi_1$ coupled with an authentication key $\varphi$.

10. The method of claim 9, wherein when the third quantum state $\Psi_2$ is equal to the second quantum state $\Psi_1$ coupled with the authentication key $\varphi$ and the quantum state $\theta_x$, the third quantum state $\Psi_2$ is capable of being coupled with a negative of the random quantum state $\theta$ and a negative of the authentication key $\varphi$ to generate a fourth quantum state $\Psi_B$ to recover the information X.

11. The method of claim 10, wherein the first quantum state $\Psi_0$ is capable of being utilized as an orthogonal base to measure the fourth quantum state $\Psi_B$.

12. The method of claim 10, further comprising randomly selecting bits to check a bit error rate, wherein if the bit error rate exceeds an acceptable rate, an alarm is triggered to indicate authentication has failed.

13. The method of claim 9, wherein when the third quantum state $\Psi_2$ is equal to the second quantum state $\Psi_1$ coupled with the quantum state $\theta_x$, the third quantum state $\Psi_2$ is capable of being coupled with a negative of the random quantum state $\theta$ to generate a fourth quantum state TB to recover the information X.

14. The method of claim 13, wherein the first quantum state $\Psi_0$ is capable of being utilized as an orthogonal base to measure the fourth quantum state $\Psi_B$.

15. The method of claim 13, further comprising randomly selecting bits to check a bit error rate, wherein if the bit error rate exceeds an acceptable rate, an alarm is triggered to indicate authentication has failed.

16. The method of claim 9, wherein the first quantum state $\Psi_0$ is different for each bit received.

17. The method of claim 9, further comprising randomly selecting bits to check a bit error rate.

18. The method of claim 9, wherein when the third quantum state $\Psi_2$ is equal to the second quantum state $\Psi_1$ coupled with the authentication key $\varphi$, the third quantum state $\Psi_2$ is capable of being coupled with a negative of the random quantum state $\theta$ and a negative of the authentication key $\varphi$ to generate a fourth quantum state, wherein the desired party authenticates a third party sending the second quantum state $\Psi_1$ if the fourth quantum state is equal to the first quantum state $\Psi_0$.

19. The method of claim 18, wherein an alarm is triggered to indicate authentication has failed if the fourth quantum state is not equal to the first quantum state $\Psi_0$.

* * * * *